United States Patent
Kanda et al.

(10) Patent No.: US 7,242,499 B2
(45) Date of Patent: Jul. 10, 2007

(54) SYSTEM FOR CREATING A VIRTUAL FILE SERVER TO PROVIDE DATA FILES

(75) Inventors: Akitsugu Kanda, Yamato (JP); Etsutaro Akagawa, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 42 days.

(21) Appl. No.: 10/932,015

(22) Filed: Sep. 2, 2004

(65) Prior Publication Data

US 2006/0007491 A1    Jan. 12, 2006

(30) Foreign Application Priority Data

Jul. 6, 2004    (JP)    ............................. 2004-199270

(51) Int. Cl.
*G06F 15/00* (2006.01)
(52) U.S. Cl. .................. 358/1.16; 709/203; 709/215; 709/221
(58) Field of Classification Search ............... 358/1.16; 709/215, 221, 203; 707/10
See application file for complete search history.

(56) References Cited

U.S. PATENT DOCUMENTS

| | | | |
|---|---|---|---|
| 6,212,558 B1 * | 4/2001 | Antur et al. ............... | 709/221 |
| 6,356,863 B1 * | 3/2002 | Sayle .......................... | 703/27 |
| 6,370,646 B1 | 4/2002 | Goodman et al. | |
| 6,895,429 B2 * | 5/2005 | Banga et al. ............... | 709/215 |
| 2001/0042118 A1 | 11/2001 | Miyake et al. | |
| 2001/0054093 A1 | 12/2001 | Iwatani ....................... | 709/223 |
| 2003/0018927 A1 * | 1/2003 | Gadir et al. ................. | 714/4 |
| 2003/0233510 A1 | 12/2003 | Umbehocker et al. ...... | 711/100 |
| 2004/0037295 A1 | 2/2004 | Tanaka et al. | |
| 2004/0044856 A1 | 3/2004 | Umbehocker et al. ...... | 711/154 |
| 2004/0081104 A1 | 4/2004 | Pan et al. .................... | 370/254 |
| 2004/0136246 A1 * | 7/2004 | Kosuge ....................... | 365/200 |
| 2005/0210067 A1 * | 9/2005 | Nakatani et al. ........... | 707/104.1 |

FOREIGN PATENT DOCUMENTS

| | | |
|---|---|---|
| JP | 10-294731 | 11/1998 |
| JP | 2003-289313 | 10/2003 |

* cited by examiner

*Primary Examiner*—Aung S. Moe
*Assistant Examiner*—Vincent M. Rudolph
(74) *Attorney, Agent, or Firm*—Antonelli, Terry, Stout & Kraus, LLP.

(57) ABSTRACT

A storage system connected to a network is provided which is capable of managing other devices connected to the network. A storage system (400) is connected via a switch (200) to a network (500) to provide clients (100) with data. The storage system has a control unit which sets the switch (200) and a setting command preserving unit which keeps a command for setting the switch (200). The control unit uses the preserved command to set the switch (200).

18 Claims, 29 Drawing Sheets

| DEVICE TYPE /OS | SETTING ITEM | COMMAND LINE |
|---|---|---|
| Swich(1) (OS1) | CHANNEL GROUP DEFINITION | #configuretion terminal<br>#interface channel-group Y |
| | CHANNEL GROUP AFFILIATED PORT AND MODE SETTING | #configuretion terminal<br>#interface ethernet X/X<br>#channel-gropu Y mode Z |
| | Tag VLAN SETTING (Channel-group) | #configuretion terminal<br>#interface channel-group Y<br>#switchport trunk encapsulation dot1q<br>#switchport mode trunk<br>#switchport allowd vlan add W |
| | Tag VLAN SETTING (Port) | #configuretion terminal<br>#interface ethernet X/X<br>#switchport trunk encapsulation dot1q<br>#switchport mode trunk<br>#switchport allowd vlan add W |
| | untagged VLAN SETTING (Channel-group) | #configuretion terminal<br>#interface channel-group Y<br>#switchport mode access<br>#switchport access vlan W |
| | untagged VLAN SETTING (Port) | #configuretion terminal<br>#interface ethernet X/X<br>#switchport mode access<br>#switchport access vlan W |
| Swich(2) (OS2) | : | : |
| : | | |

COMMAND LINE DB TABLE

FIG 5

| DEVICE TYPE/OS | SETTING ITEM | COMMAND LINE |
|---|---|---|
| Server1 (OS3) | OBTAIN HOST NAME | #hostname |
| | OBTAIN IP ADDRESS | #ifconfig |
| | OBTAIN SHARED DIRECTORY | #exports |
| | OBTAIN NAME OF HOST/NETWORK TO WHICH DATA IS DISCLOSED | #exports |
| | OBTAIN FILE SHARING PROTOCOL | #netstat-l |
| | OBTAIN USER AUTHENTICATION MEASURE | #cat/etc/nsswitch.conf |
| Server2 (OS4) | ⋮ | ⋮ |
| ⋮ | | |

COMMAND LINE DB TABLE

FIG 6

| DEVICE NAME | DEVICE TYPE/OS | REMOTE ACCESS PROTOCOL | AUTHENTICATION INFORMATION |
|---|---|---|---|
| SWITCH1 | Switch1 (OS1) | telnet | LOGIN ID |
| | | | LOGIN PASSWORD |
| | | | MANAGEMENT ID |
| | | | MANAGEMENT PASSWORD |
| | | | MANAGEMENT IP ADDRESS |
| | | | SUBNET MASK |
| SERVER1 | Server1 (OS1) | telnet | LOGIN ID |
| | | | LOGIN PASSWORD |
| | | | IP ADDRESS |
| | | | SUBNET MASK |
| ⋮ | ⋮ | ⋮ | ⋮ |

AUTHENTICATION INFORMATION DB TABLE

FIG 7

| NAS SIDE PORT NUMBER | SWITCH SIDE | |
|---|---|---|
| | SWITCH NAME | PORT NUMBER |
| eth0 | SWITCH1 | Ethernet0/1 |
| eth1 | SWITCH2 | Ethernet0/1 |
| ⋮ | ⋮ | ⋮ |

PAIR PORT STORING DB TABLE

FIG 8

| ITEM | VALUE |
|---|---|
| IP ADDRESS/NET MASK | xxx.xxx.xxx.xxx/xx |
| HOST NAME | host1 |
| SHARED DIRECTORY | /mnt/share1 |
| NAME OF HOST/NETWORK TO WHICH DATA IS DISCLOSED | host2,network 1 |
| FILE SHARING PROTOCOL | protocol1 |
| USER AUTHENTICATION MEASURE | method1 |
| ... | ... |

FILE SHARING SETTING INFORMATION STORING DB TABLE

FIG 9

| NETWORK DEVICE | VLAN ID IN USE |
|---|---|
| eth1 | 2,3,4 |
| eth2 | 10,3,20 |
| . . . | . . . |

VLAN ID DB TABLE

FIG 10

MANAGEMENT/AUTHENTICATION SETTING SCREEN

| | |
|---:|:---|
| DEVICE NAME | Switch1 ▼ |
| TARGET DEVICE TYPE/OS | Cisco IOS ▼ |
| REMOTE CONTROL PROTOCOL | telnet ▼ |
| LOGIN ID | |
| LOGIN PASSWORD | |
| MANAGEMENT ID | |
| MANAGEMENT PASSWORD | |
| IP ADDRESS | |
| SUBNET MASK | |

( LOG IN )   ( REGISTER )  ( CANCEL )

*FIG 16*

INFORMATION SUCCESSFULLY OBTAINED. SHOULD FILE SERVER SHUT DOWN?

YES  NO

FIG 28

SYSTEM FOR CREATING A VIRTUAL FILE SERVER TO PROVIDE DATA FILES

CLAIM OF PRIORITY

The present application claims priority from Japanese application P2004-199270 filed on Jul. 6, 2004, the content of which is hereby incorporated by reference into this application.

BACKGROUND

This invention relates to a storage system. More specifically, this invention relates to a storage system attached to a network which manages other devices connected to the network.

In a network system composed of a file server, a switch, and others which are networked, a command (command line) corresponding to the type (vendor or the like) or OS of the file server or of the switch is inputted from an management terminal or the like and used to set the file server and the switch or to modify their configurations.

A technique of setting a VLAN simultaneously for plural network devices with the use of a GUI has been proposed in order to prevent an operator from setting the devices to wrong setting. A known example of the technique is an error minimizing method which uses a GUI to interconnect plural network devices and which includes a step of causing a screen to display an object that represents a first network device and an object that represents a second network device, and a step of logically connecting the first network device and the second network device in response to selecting the object that represents the first network device and the object that represents the second network device (see JP 2003-289313 A, for example).

Another technique sets plural network devices to VLAN setting based on configuration information of a network which is collected by SNMP. A known example of this technique is an operation management system in which network configuration information is collected from each of plural objects, and display data is created, from the collected network configuration information, for each of several types of logical network configuration for the respective objects. The system controls a virtual screen to display a physical connection relation, a logical connection relation, and a virtual connection relation according to the display data created (see JP 10-294731 A, for example).

Also known is a file migration method in which files are migrated from an existing file server set up in the periphery of NAS to a new file server by installing, in the new file server, software for fetching various setting information necessary (see U.S. Pat. No. 6,370,646, for example).

SUMMARY

A command line corresponding to the type (vendor or the like) or OS of a file server or of a switch is used to set the file server and the switch or to modify their configurations (for instance, to set or modify VLAN setting). This means that different commands are needed for different types of or different OSs of file server or switch, and is not conductive to efficiency in managing plural devices in a centralized manner.

The prior art, JP 2003-289313 A discloses a method of setting a VLAN by manipulating a GUI, but does not mention modification of the VLAN configuration or other similar matters.

The prior art, JP 10-294731 A is capable of setting a VLAN and changing the VLAN configuration by applying SNMP (Simple Network Management Protocol) to a network system, but is not applicable to a device that does not support SNMP.

The prior art, U.S. Pat. No. 6,370,646 requires installment of dedicated software in the new file server. Since the software has to be prepared for every device type and OS, development/management cost is high.

This invention has been made in view of the above problems, and it is therefore an object of this invention to provide a storage system that manages plural devices in a centralized manner.

This invention provides a storage system connected to a network via a switch to provide a client with data, including: a control unit that sets the switch; and a setting command preserving unit that stores a command for setting the switch, in which the control unit uses the preserved command in setting the switch.

The setting command preserving unit stores in advance a command for every type of device/OS connected to the network.

According to this invention, a storage system can manage devices (a switch and a file server) of a network system in a centralized manner, thereby enhancing the efficiency in system design and in system operation.

BRIEF DESCRIPTION OF THE DRAWINGS

FIG. 5 is an explanatory diagram showing an example of a command line DB table according to the first embodiment of this invention.

FIG. 6 is an explanatory diagram showing another example of the command line DB table according to the first embodiment of this invention.

FIG. 7 is an explanatory diagram showing an example of an authentication information DB table according to the first embodiment of this invention.

FIG. 8 is an explanatory diagram showing an example of a pair port storing DB table according to the first embodiment of this invention.

FIG. 9 is an explanatory diagram showing an example of a file share configuration storing DB table according to the first embodiment of this invention.

FIG. 10 is an explanatory diagram showing an example of a VLAN-ID DB table according to the first embodiment of this invention.

FIG. 16 is an explanatory diagram showing a management/authentication setting screen according to the first embodiment of this invention.

FIG. 28 is an explanatory diagram showing a file server shutdown confirmation screen according to the second embodiment of this invention.

DETAILED DESCRIPTION OF THE PREFERRED EMBODIMENTS

A first embodiment of this invention will be described below with reference to the accompanying drawings.

Figure 1:
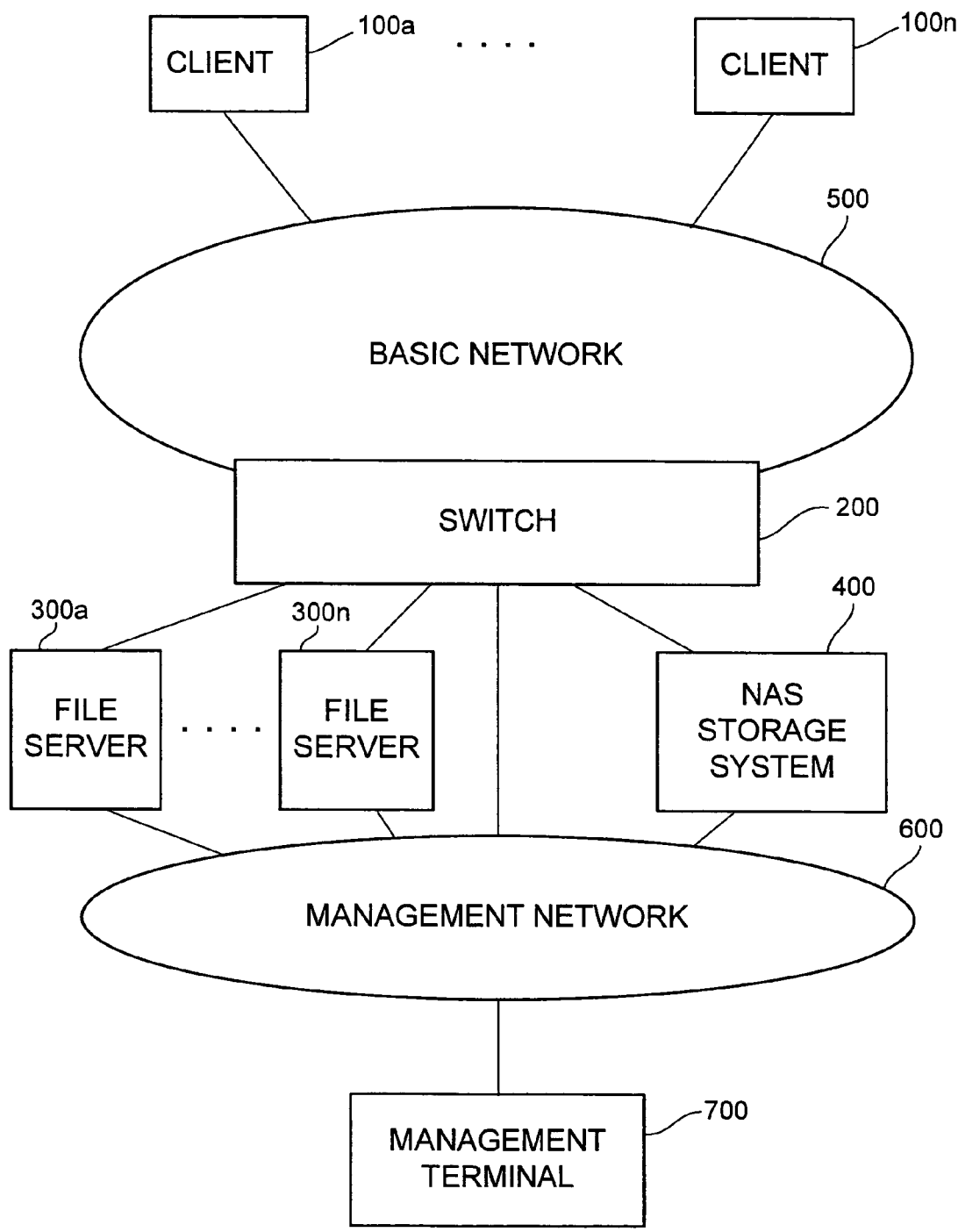
FIG. 1 is a block diagram showing the configuration of a network system according to a first embodiment of this invention.

FIG. 1 is a block diagram showing the configuration of a network system according to the first embodiment of this invention.

A plurality of clients 100 (100a to 100n) and a switch 200 are coupled to a basic network 500.

the switch 200 are coupled to plural file servers 300 (300a to 300n) and a NAS storage system 400. The clients 100, the file servers 300, and the NAS storage system 400 are communicable with one another through the switch 200.

An management terminal 700 is coupled via a management network 600 to the switch 200, the file servers 300, and the NAS storage system 400.

The clients 100 are provided with data or a file from the file servers 300 or from the NAS storage system 400 through the basic network 500 and the switch 200.

The switch 200 relays communication data (packets and the like) sent from the clients 100, the file serves 300, the NAS storage system 400, etc.

The file servers 300 are servers equipped with disk drives for storing files.

The NAS storage system 400 is a server that functions as NAS (Network Attached Storage).

The management terminal 700 is a terminal for setting and updating management information of the switch 200, of the file servers 300 and of the NAS storage system 400.

The basic network 500 and the management network 600 are LANs, WANs, or other similar networks.

Figure 2:
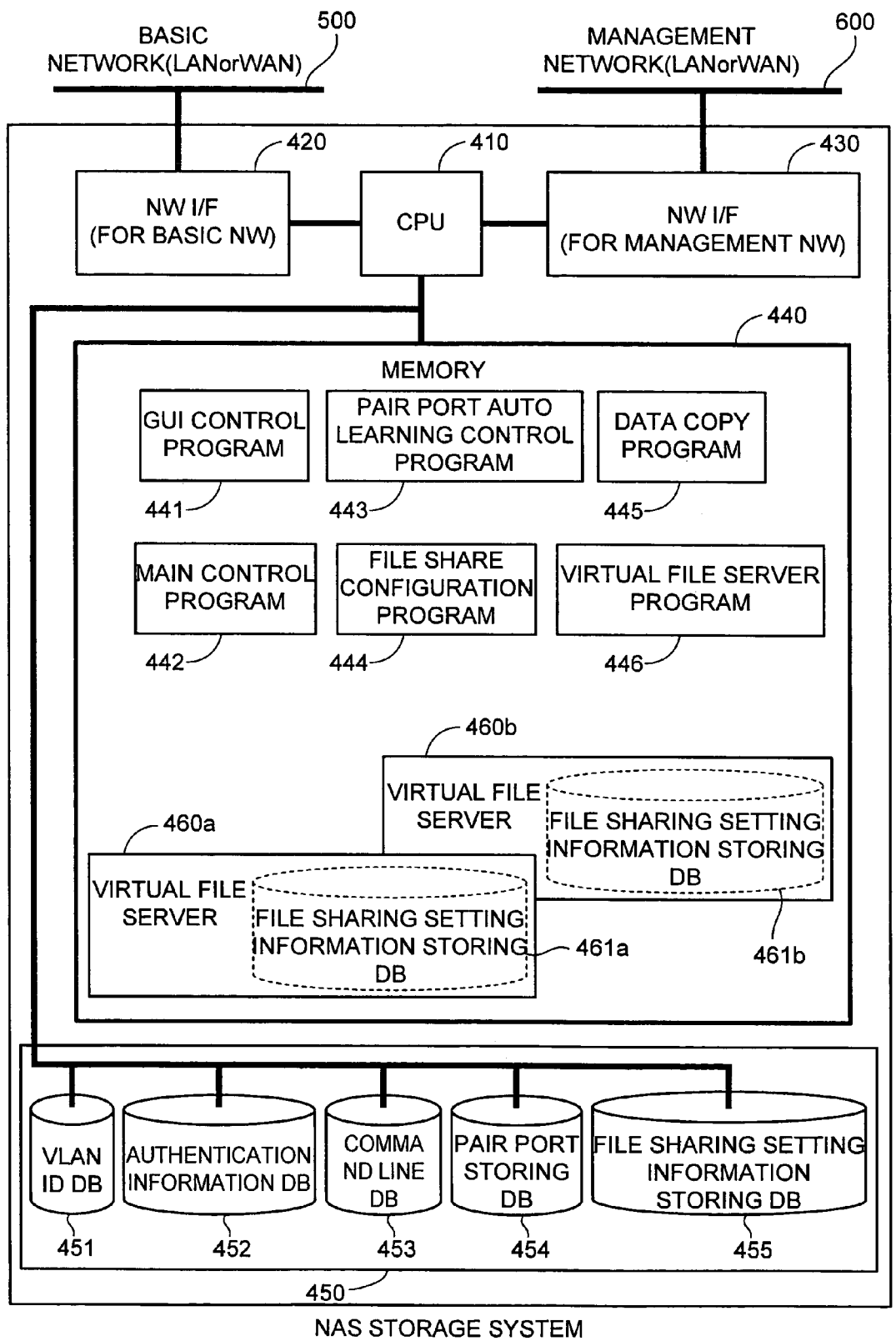
FIG. 2 is a block diagram showing the configuration of a NAS storage system 400 according to the first embodiment of this invention.

FIG. 2 is a block diagram showing the configuration of the NAS storage system 400.

The NAS storage system 400 is composed of a CPU 410, network interfaces (hereinafter abbreviated as NW I/F) 420 and 430, a memory 440, a database (hereinafter abbreviated as DB) 450, and other components.

The CPU 410 controls the NAS storage system 400.

The NW I/F 420 is an interface for communicating on the basic network 500.

The NW I/F 430 is an interface for communicating on the management network 600.

The memory 440 is a temporary memory device such as a DRAM. The memory 440 stores areas to be used by various programs and by virtual file servers 460. The memory 440 may be a non-volatile memory device such as a hard disk, instead of a DRAM.

The DB 450 is a memory device such as a hard disk. The DB 450 stores various databases. The DB 450 may be a temporary memory device such as a DRAM, instead of a hard disk.

The memory 440 holds a GUI control program 441, a main control program 442, and a pair port auto learning control program 443, a file share configuration program 444, a data copy program 445, and a virtual file server program 446.

The GUI control program 441 is for displaying a management screen in managing the NAS storage system 400. When an administrator sets the NAS storage system 400 through the management terminal 700, the GUI control program 441 displays a NAS storage device management screen to the CRT of the management terminal 700.

The main control program 442 controls other programs in the NAS storage system 400.

The pair port auto learning control program 443 obtains port information of the switch 200 coupled to the NAS storage system 400. Specifically, the program 443 obtains pairing ("pair") between information of a port of the switch 200 that is coupled to the NAS storage system 400 and information of a port of the NAS storage system 400 that is coupled to the switch 200.

The file share configuration program 444 obtains file share configuration from the file servers 300.

The data copy program 445 obtains data of the file servers 300. Specifically, when the NAS storage system 400 relocates data of the file servers 300 to virtual file servers in the NAS storage, the data copy program 445 obtains data (files) in the file servers 300.

The virtual file server program 446 sets up virtual file servers in the NAS storage system 400.

The virtual file servers 460 (460a and 460b) are virtual file server areas set by the virtual file server program 446. The virtual file servers 460 are recognized as the actual file servers 300 by the clients 100. The clients 100 can read or write a file on the virtual file servers 460. The entity of files in the virtual file servers 460 may be kept in the file servers 300 or may be kept in the storage of the NAS storage system 400.

File share configuration storing DBs 461 store file sharing information in the virtual file servers 460, information on access rights, and the like. The file share configuration storing DBs 461 store file share configuration of the virtual file servers 460 set up in the NAS storage system 400. A file share configuration storing DB 455 stores file share configuration in the NAS storage system 400.

FIG. 2 shows the two virtual file servers 460a and 460b. The two virtual file servers respectively correspond to two file servers (300a and 300b) out of the n file servers shown in FIG. 1; the file server 300a is set as the virtual file server 460a and the file server 300b is set as the virtual file server 460b. When the clients 100 try to access files held in the file server 300a, it is actually the virtual file server 460a that is accessed. The entity of those files may be kept in the file server 300a or may be kept in the NAS storage system 400.

The DB 450 holds a VLAN-ID DB 451, an authentication information DB 452, a command line DB 453, a pair port storing DB 454, and the file share configuration storing DB 455.

The VLAN-ID DB 451 stores VLAN-ID information set in the switch 200.

The authentication information DB 452 stores information such as login IDs and passwords for setting other components of the network system than the NAS storage system 400, for example, the switch 200 and the file servers 300.

The command line DB 453 stores command lines (commands to obtain information, to set, and the like) for setting other components of the network system than the NAS storage system 400, for example, the switch 200 and the file servers 300.

The pair port storing DB 454 stores switch port information obtained by the pair port auto learning control program 443 described above.

The file share configuration storing DB 455 stores, as has already been mentioned, file sharing information in the virtual file servers 460, information on access rights, and the like.

Figure 3:
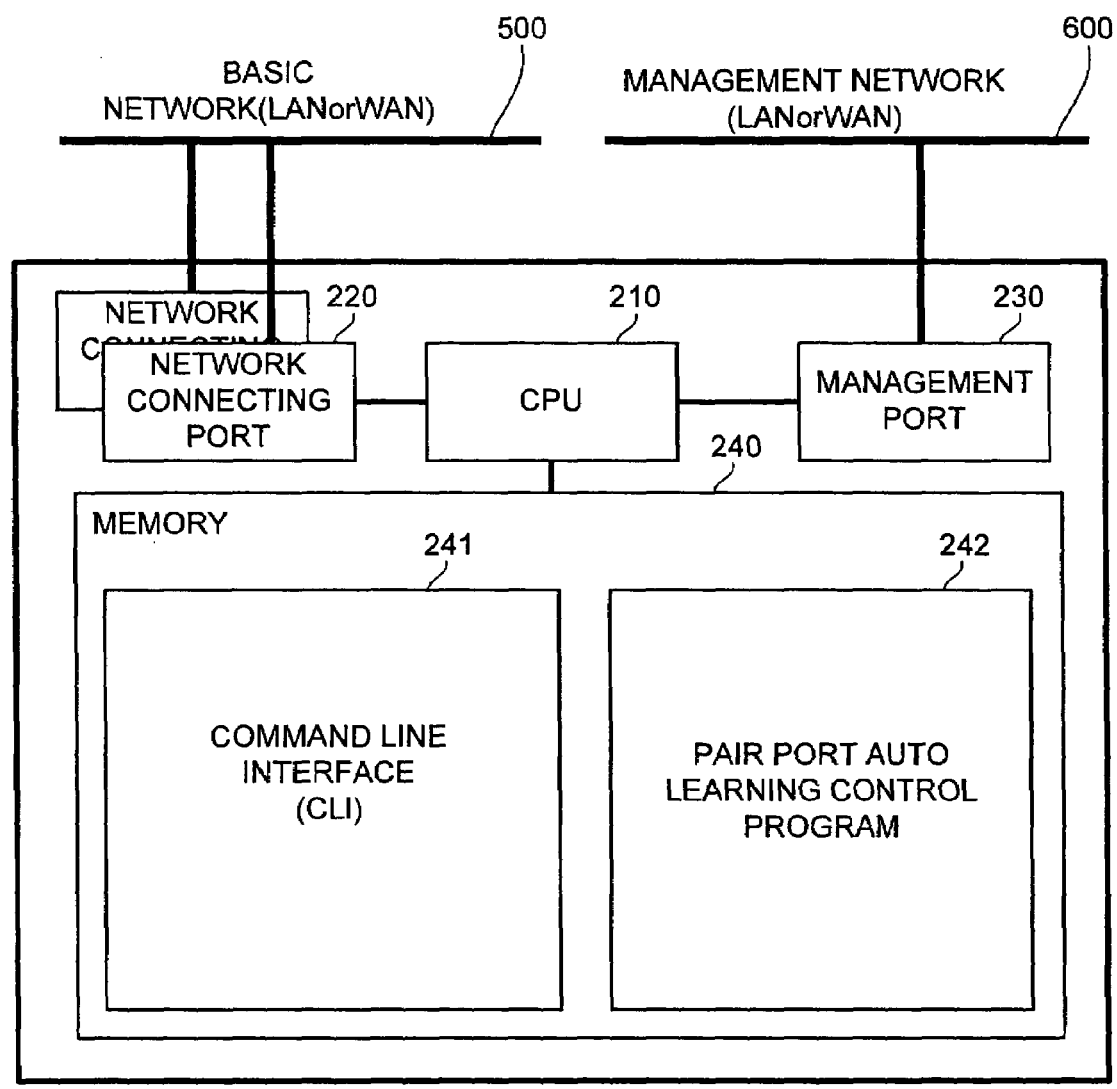
FIG. 3 is a block diagram showing the configuration of a switch 200 according to the first embodiment of this invention.

FIG. 3 is a block diagram showing the configuration of the switch 200.

The switch 200 is composed of a CPU 210, a network connecting port 220, a management port 230, a memory 240, and other components.

The CPU 210 controls the switch 200.

The network connecting port 220 is a port for connecting the switch 200 to the basic network 500 or to other nodes. One port of the network connecting port 200 is assigned to one network or one device (node). When VLAN (Virtual LAN) setting is employed, for instance, a node that belongs to a VLAN is specified by the number of a port to which the node is connected.

The management port 230 is a port for connecting the switch 200 to the management network 600.

The memory 240 is a temporary memory device such as a DRAM. The memory 240 holds a command line interface (hereinafter abbreviated as CLI) 241 and a pair port auto learning control program 242. The memory 240 may be a non-volatile memory device such as a hard disk, instead of a DRAM.

The CLI 241 interprets a command for managing setting and modification of the configuration of the switch 200. For instance, the configuration of the switch 200 is set or changed by having the management terminal 700 specify a command that is defined for the CLI 241.

The pair port auto learning control program 242 is a program for obtaining information of another node that is connected to a port of the switch 200. Specifically, the program 242 obtains, upon receiving an instruction from the NAS storage system 400, pairing ("pair") between information of the port of the switch 200 that is connected to the other node and port information contained in the other node.

Figure 4:
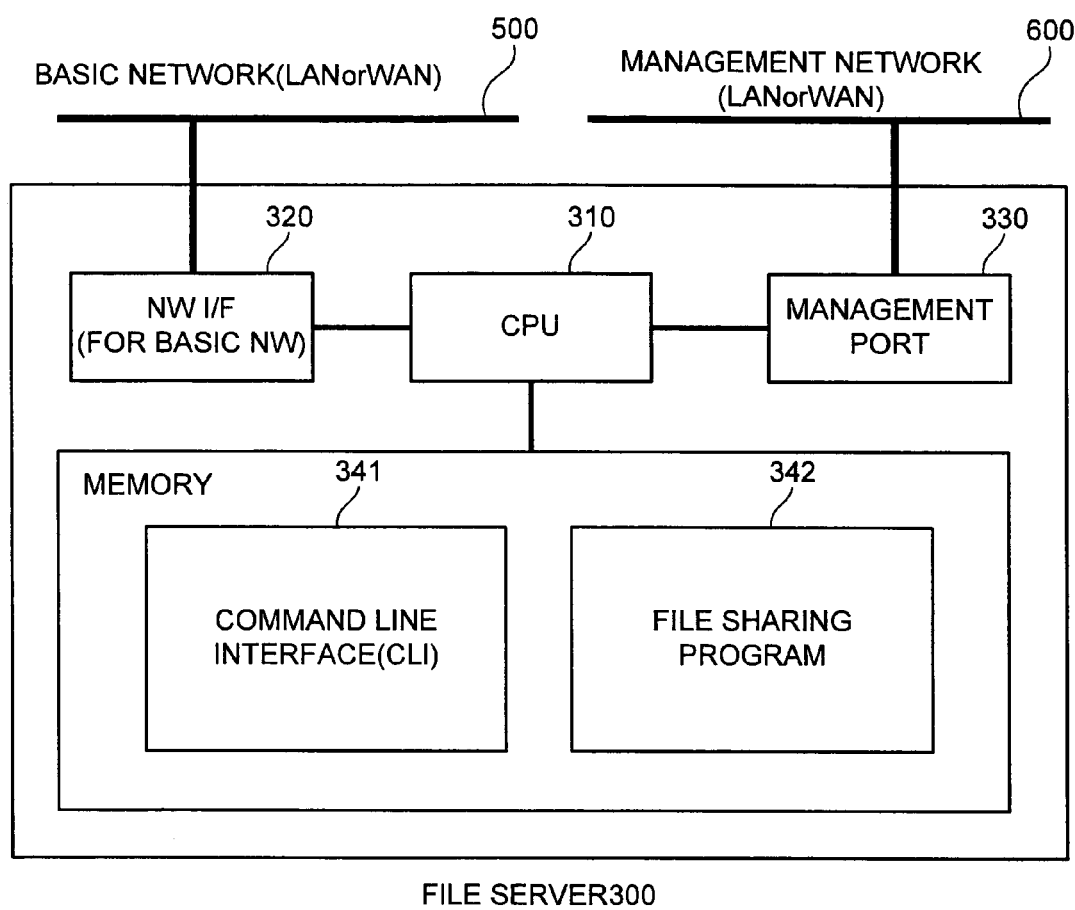
FIG. 4 is a block diagram showing the configuration of file servers 300 according to the first embodiment of this invention.

FIG. 4 is a block diagram showing the configuration of the file servers 300.

The file servers 300 are each composed of a CPU 310, a NW I/F 320, a management port 330, a memory 340, and other components.

The CPU 310 controls the file servers 300.

The NW I/F 320 is an interface for communicating on the basic network 500.

The management port 330 is an interface for communicating on the management network 600.

The memory 340 is a temporary memory device such as a DRAM. Held in the memory 340 are a CLI 341 and a file sharing program 342. The memory 340 may be a non-volatile memory device such as a hard disk, instead of a DRAM.

The CLI 341 interprets a command for managing setting and modification of the configuration of the file servers 300. For instance, the configuration of the file servers 300 is set or changed by having the management terminal 700 specify a command that is defined for the CLI 341.

FIGS. 5 and 6 are explanatory diagrams each showing an example of a command line DB table which is to be stored in the command line DB 453 of the NAS storage system 400.

The command line DB table is used when the NAS storage system 400 sets or changes the configuration of a target node. Generally, different command lines are prepared for different device types or different OSs. The command line DB table therefore stores command lines for all major manufacturers. The command line DB table also stores every series of command lines used in a given operation performed on a target device (for example, link aggregation setting and VLAN-ID setting which will be described later) in an order in which the series of command lines are executed. The NAS storage system 400 carries out the given operation by sequentially executing the series of command lines stored in the command line DB table.

The command line DB table has a "device type/OS" field, a "setting item" field, and a "command line" field.

The "device type/OS" field stores information of the device type and OS of a node (switch, file server, or the like) for which the command line in question is intended. The "setting item" field stores information on what operation the command line dictates. The "command line" filed stores the actual command line.

The example of FIG. 5 shows that a command line "#configuration terminal #interface channel-group Y" is used to perform "channel group definition" on a switch whose device type is "Switch (1)" and OS is "OS 1". The example of FIG. 6 shows that a command line "#hostname" is used to "obtain host name" for a file server whose device type is "Server 1" and OS is "OS 3".

FIG. 7 is an explanatory diagram showing an example of an authentication information DB table which is stored in the authentication information DB 452 of the NAS storage system 400.

The authentication information DB table is used when the NAS storage system 400 sets or changes the configuration of a target device.

The authentication information DB table has a "device name" field, a "device type/OS" field, a "remote access protocol" field, and an "authentication information" field.

The "device name" field stores names given to respective target nodes. The "device type/OS" field in this table is identical with the "device type/OS" field in the command line DB 453. The "remote access protocol" field stores information on a protocol used to access the node in question. The "authentication information" field stores information for verifying an access source to the node in question.

The example of FIG. 7 shows that a switch whose device name is "switch 1", device type is "Switch 1" and OS is "OS 1" is accessed by employing a "telnet" protocol. Information used for authentication (a login ID, a login password, a management IP address, and the like) is stored in the "authentication information" field.

FIG. 8 is an explanatory diagram showing an example of a pair port storing DB table which is stored in the pair port storing DB 454 of the NAS storage system 400.

The pair port storing DB table stores information of pairing between a port of the NAS storage system 400 and a port of the switch 200 which are connected to each other (pair port).

The pair port storing DB table has a "NAS side port number" field and a "switch side" field.

The "NAS side port number" field stores information indicating a port of the NAS storage system 400. The "switch side" field stores information indicating a port of the switch 200 that is connected to a port having the corresponding NAS side port number. The "switch side" field includes a "switch name" field and a "port number" field. The "switch name" field stores the name of the switch in question (device name, identical with FIG. 7). The "port number" field stores information indicating the port number of the switch in question.

The example of FIG. 8 shows that a port number "eth0" of the NAS storage system 400 is associated with a port number "Ethernet 0/1" of a switch whose switch name is "switch 1".

FIG. 9 is an explanatory diagram showing an example of a file share configuration storing DB table which is stored in the file share configuration storing DB 455 of the NAS storage system 400.

The file share configuration storing DB table stores, when a virtual file server is set up in the NAS storage system 400, sharing setting information of files held in the virtual file server.

The file share configuration storing DB table has an "item" field and a "value" field. The "value" field stores the contents of information that is shown in the "item" field.

In the example of FIG. 9, the file share configuration storing DB table stores information such as "IP address/net mask", "host name", "shared directory", "host/network to which a file is disclosed", "file sharing protocol", and "user authentication measure" of the virtual file server set up in the NAS storage system 400.

FIG. 10 is an explanatory diagram showing an example of a VLAN-ID DB table which is stored in the VLAN-ID DB 451 of the NAS storage system 400.

The VLAN-ID DB table stores information about whether a VLAN-ID defined by the network system to which the NAS storage system 400 belongs is in use or not.

Described next is the operation of the network system according to the first embodiment of this invention.

In the network system according to the first embodiment of this invention, the NAS storage system 400 can set or change the configuration of the switch 200 connected to the network system.

Figure 11:
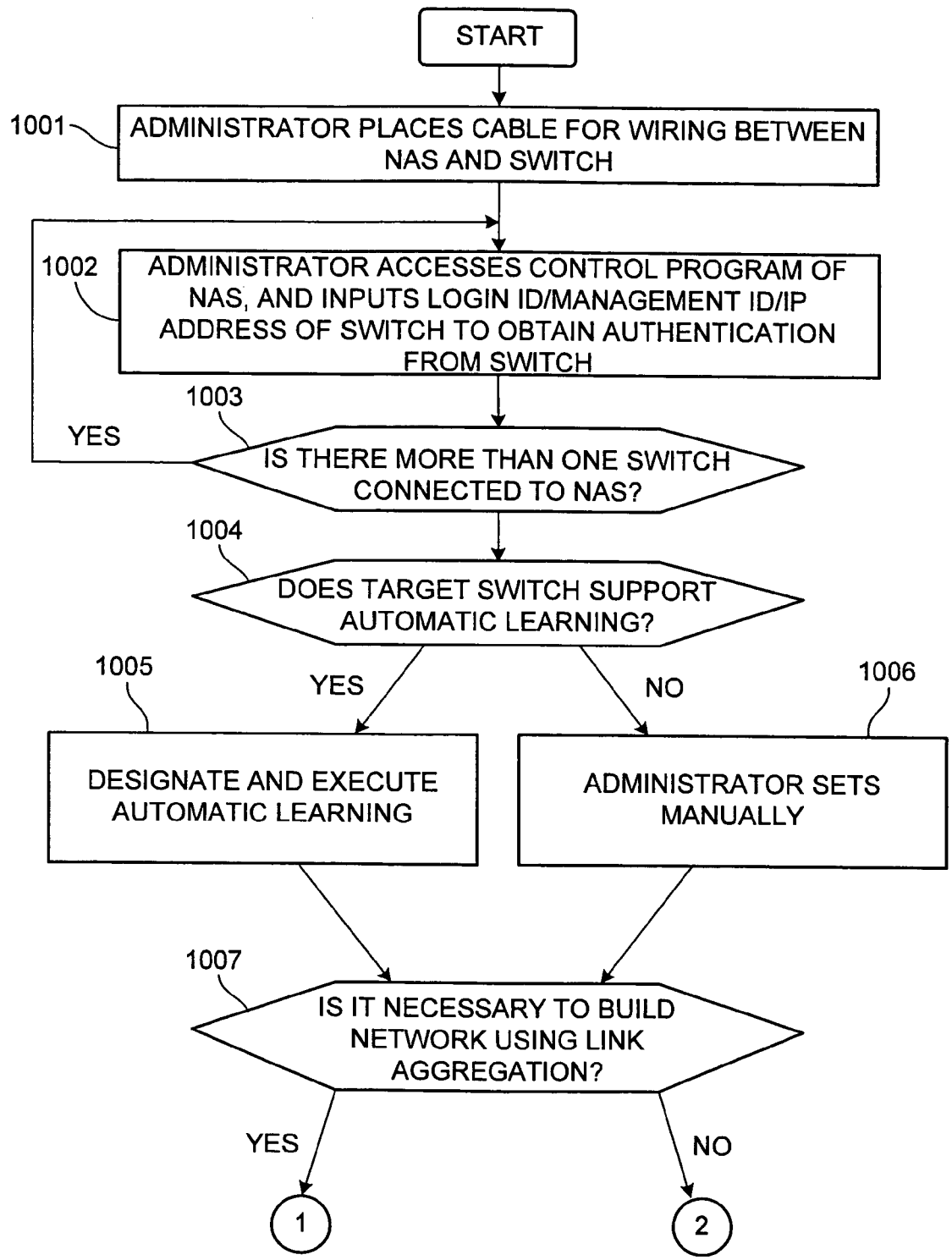
FIG. 11 is a flow chart for processing of the network system according to the first embodiment of this invention.
Figure 12:
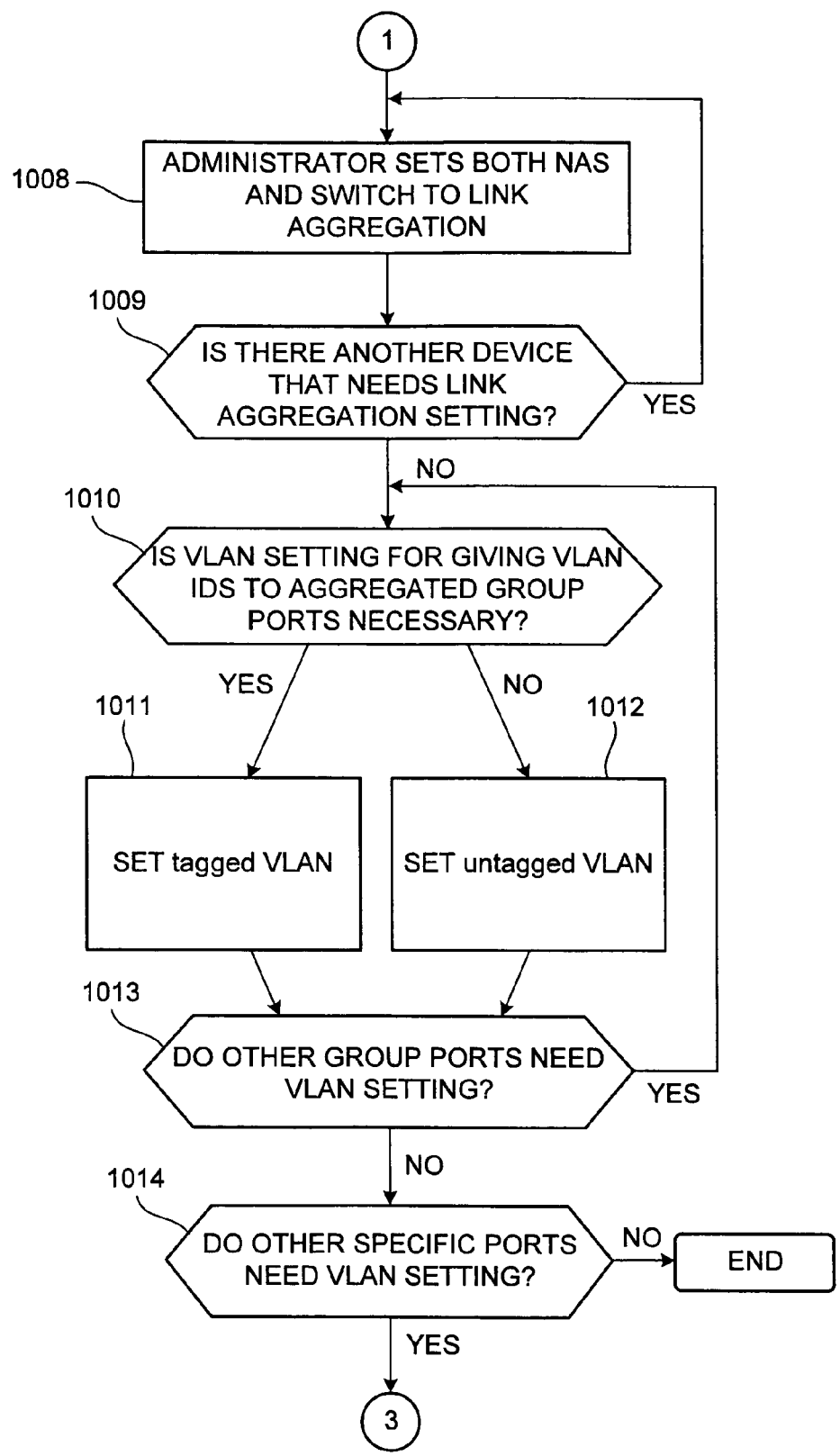
FIG. 12 is a flow chart for processing of the network system according to the first embodiment of this invention.
Figure 13:
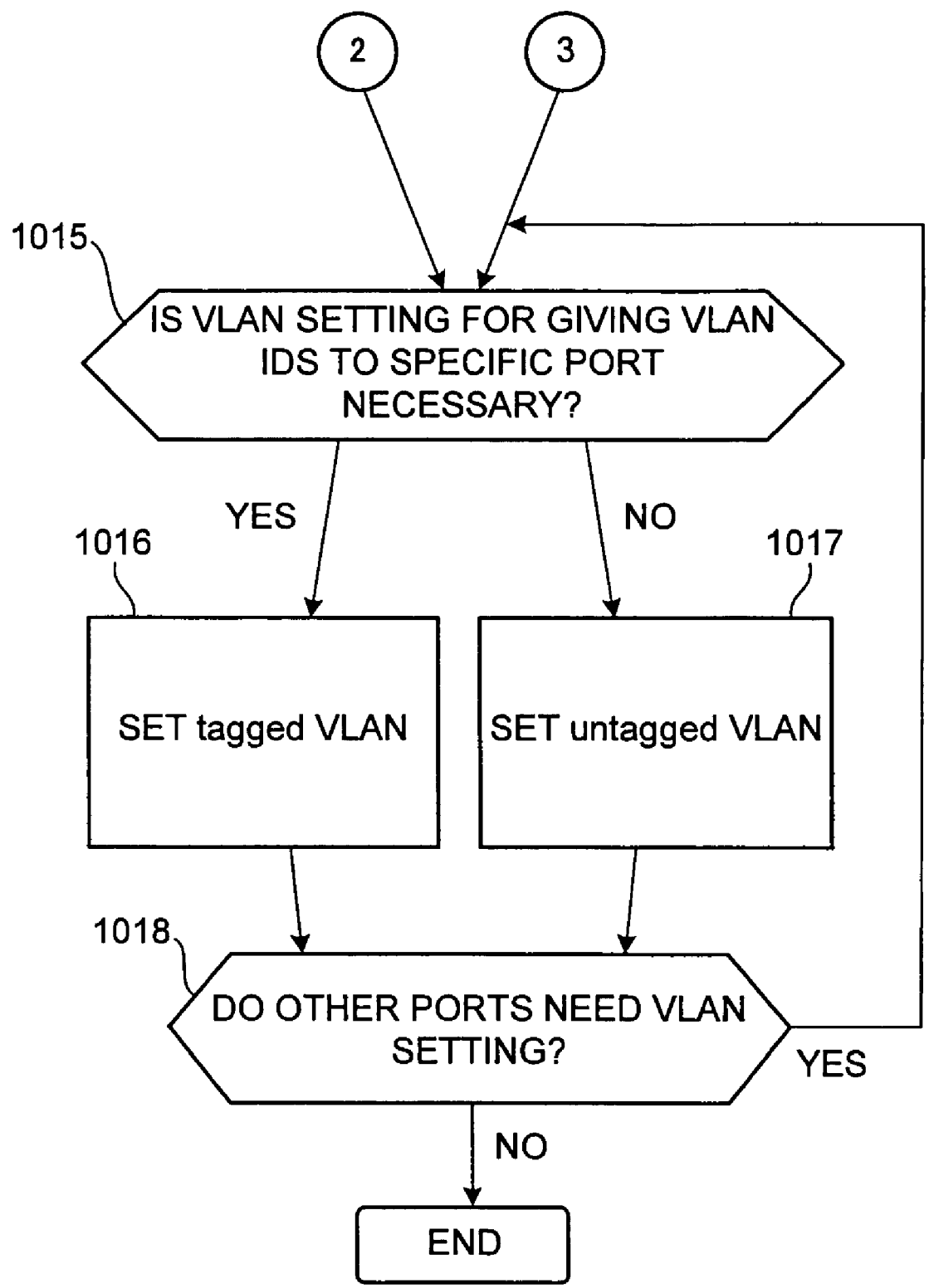
FIG. 13 is a flow chart for processing of the network system according to the first embodiment of this invention.

FIGS. 11 to 13 are flow charts showing processing of the network system according to the first embodiment of this invention.

First, an administrator of the network system places a cable for wiring between the NAS storage system 400 and the switch 200 (processing 1001). The processing 1001 is unnecessary when the NAS storage system 400 is connected to the network system in advance.

The administrator then accesses the NAS storage system 400 from the management terminal 700. The administrator inputs authentication information for the switch 200 through the GUI control program of the NAS storage system 400 accessed, so that the switch 200 tests the validity of the access (processing 1002). Details of the processing 1002 will be described later with reference to FIG. 14.

If at this point there is more than one switch 200 connected to the NAS storage system 400, the processing 1002 is repeated (processing 1003).

Next, the administrator judges whether or not the switch 200 by which authentication is made supports auto learning (processing 1004). When the switch supports auto learning, the administrator specifies auto learning and sets a port number pair (processing 1005). Details of the processing 1005 will be described later with reference to FIG. 19. When the switch does not support auto learning, a port number pair is set manually (processing 1006). Details of the processing 1006 will be described later with reference to FIG. 17.

The administrator then judges whether link aggregation is necessary or not. When link aggregation is necessary, the procedure advances to processing illustrated in FIG. 12. When link aggregation is unnecessary, the procedure advances to processing illustrated in FIG. 13 (processing 1007).

In FIG. 12, the administrator sets link aggregation (processing 1008). Details of the processing 1008 will be described later with reference to FIG. 20.

If at this point another link aggregation setting is necessary, the processing 1008 is repeated (processing 1009).

Next, it is judged whether setting plural VLAN-IDs to a group on which link aggregation has been performed is necessary or not, in other words, whether tagged VLAN setting is necessary or not (processing 1010). When it is necessary to set a tagged VLAN, tagged VLAN setting processing is carried out (processing 1011). When it is not necessary to set a tagged VLAN, an untagged VLAN is set (processing 1012). Details of the processing 1011 and 1012 will be described later with reference to FIG. 22.

If at this point other groups need to set a VLAN, the processing 1010 through 1012 is repeated (processing 1013).

When it is judged that setting a VLAN to a port on which link aggregation is not performed is necessary, the procedure moves to processing of FIG. 13. When it is judged that there is no more group or port left that needs VLAN setting, the processing is terminated (processing 1014).

In FIG. 13, it is judged whether or not setting plural VLAN-IDs to a specific port is necessary, in other words, whether setting a tagged VLAN is necessary or not (processing 1015). When it is necessary to set a tagged VLAN, tagged VLAN setting processing is carried out (processing 1016). When it is not necessary to set a tagged VLAN, an untagged VLAN is set (processing 1017). Details of the processing 1016 and 1017 will be described later with reference to FIG. 22.

If at this point other groups need to set a VLAN, the processing 1015 through 1017 is repeated. When it is judged that there is no more group left that needs VLAN setting, the processing is terminated (processing 1018).

Figure 14:
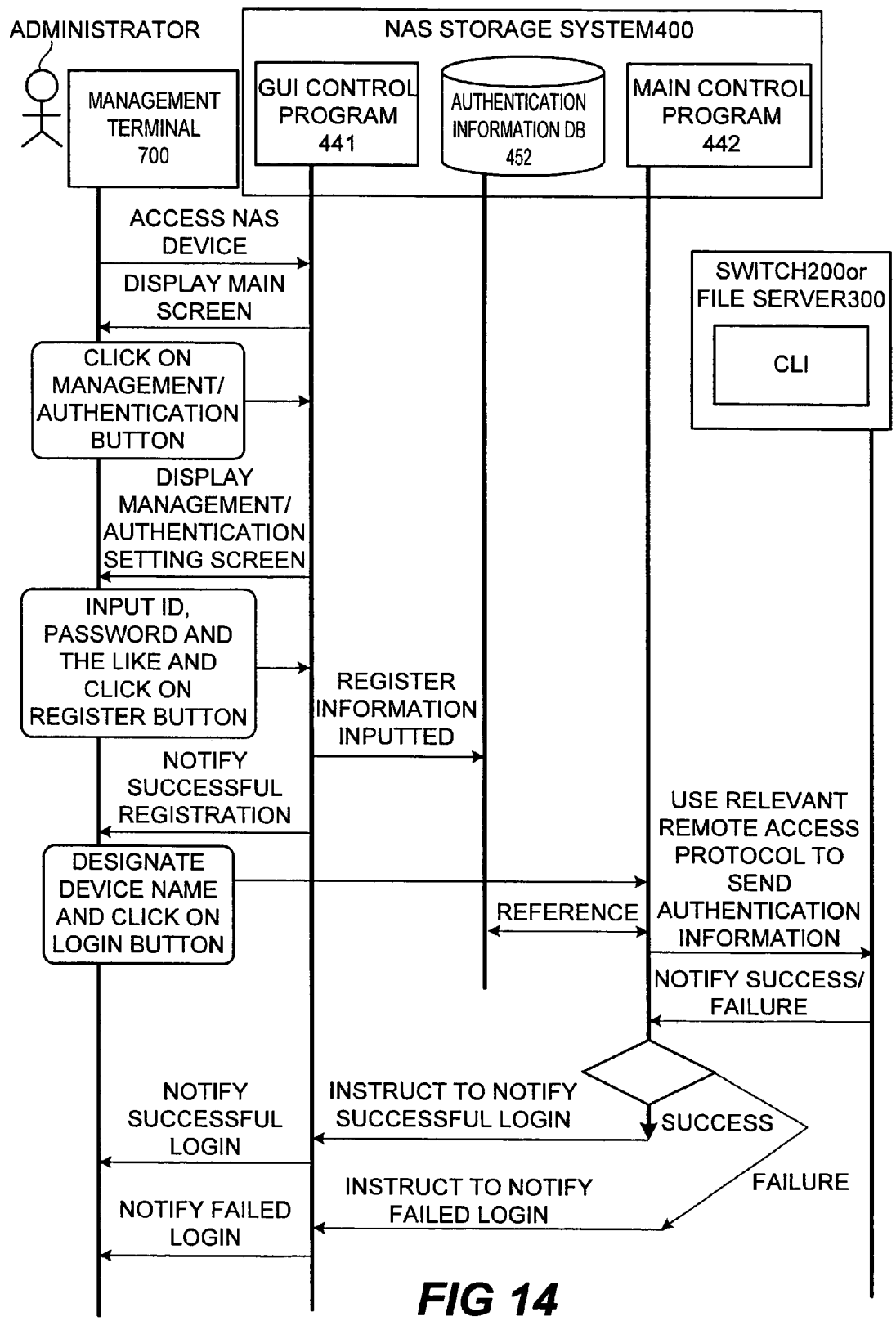
FIG. 14 is a sequence diagram showing authentication processing according to the first embodiment of this invention.

FIG. 14 is a sequence diagram showing authentication processing performed between the NAS storage system 400 and the switch 200.

Figure 15:
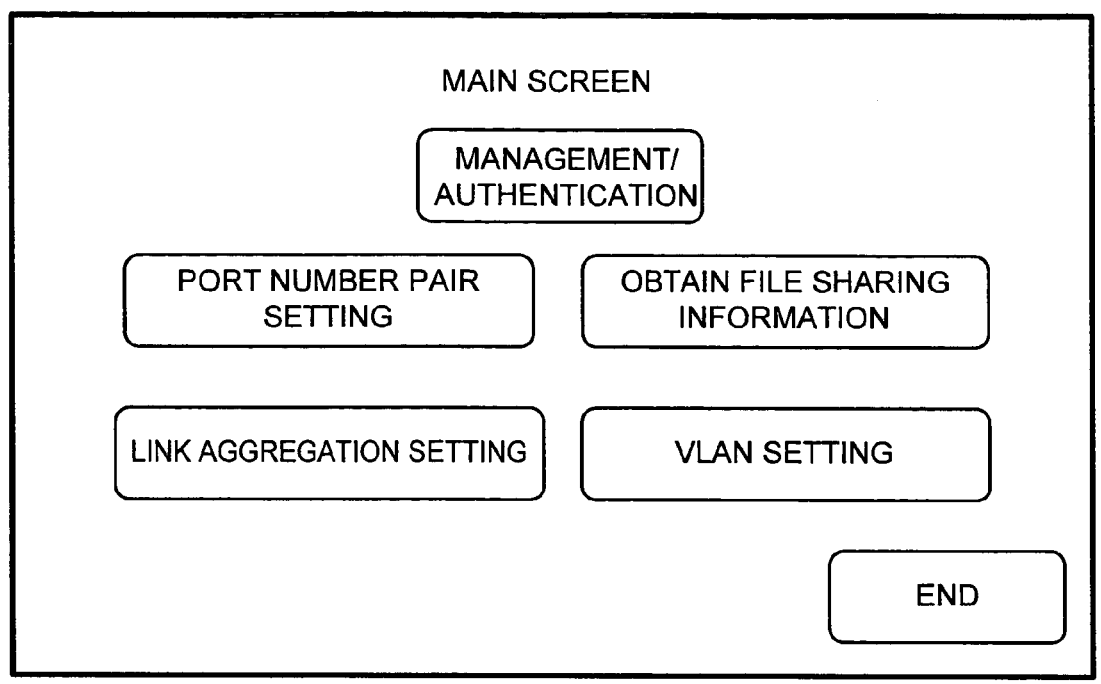
FIG. 15 is an explanatory diagram showing a main screen according to the first embodiment of this invention.

The administrator manipulates the management terminal 700 to access the NAS storage system 400. In the NAS storage system 400 accessed, the GUI control program 441 causes the display of the management terminal 700 to display a main screen (see FIG. 15) in response to the access.

The administrator manipulates (clicks on) a "management/authentication" button on the main screen displayed on the management terminal. With the click of the "management/authentication" button, the GUI control program 441 of the NAS storage system 400 displays a management/authentication setting screen (see FIG. 16).

On the management/authentication setting screen, the administrator inputs authentication information (the device type/OS, remote control protocol, login ID, password, management ID, management password, IP address, and subnetmask) of a switch by which authentication is to be made, and clicks on a "register" button.

Upon receiving the authentication information, the GUI control program 441 of the NAS storage system 400 registers the authentication information in the authentication information DB 452. When the information is successfully registered, a message to that effect is sent to the management terminal 700. Once authentication information is successfully registered, the administrator only has to specify the device type/OS to establish authentication between the NAS storage system 400 and the switch 200 with the use of the authentication information registered in the authentication information DB 452.

For authentication with the use of the device/OS name, the administrator specifies a device/OS name on the management/authentication setting screen. Registered device/OS names of the switch 200 are displayed as a pull-down menu for selection by the administrator. After one of the device/OS names is selected, a "log in" button is clicked.

With the click of the "log in" button, the main control program 442 of the NAS storage system 400 first obtains authentication information of the corresponding switch 200 by referencing the authentication information DB 452. Then the main control program 442 uses the IP address and the remote control protocol that are contained in the obtained authentication information to access the switch 200. Then the access is tested for authentication by using the login ID, the password, and other data that are contained in the authentication information. When the access is verified by the switch 200, the main control program 442 instructs the GUI control program 441 to send a message "login succeeded" and to send a message "login failed" when the access is not verified.

Upon receiving the instruction, the GUI control program 441 notifies the management terminal 700 of success or failure of login.

The above processing, the administrator inputs only specifying its device/OS name for authentication once authentication information is registered in the NAS storage system 400 by an administrator. Authentication processing for the file servers 300 is exactly the same as shown in FIG. 14, which illustrates authentication processing for the switch 200.

Figure 17:
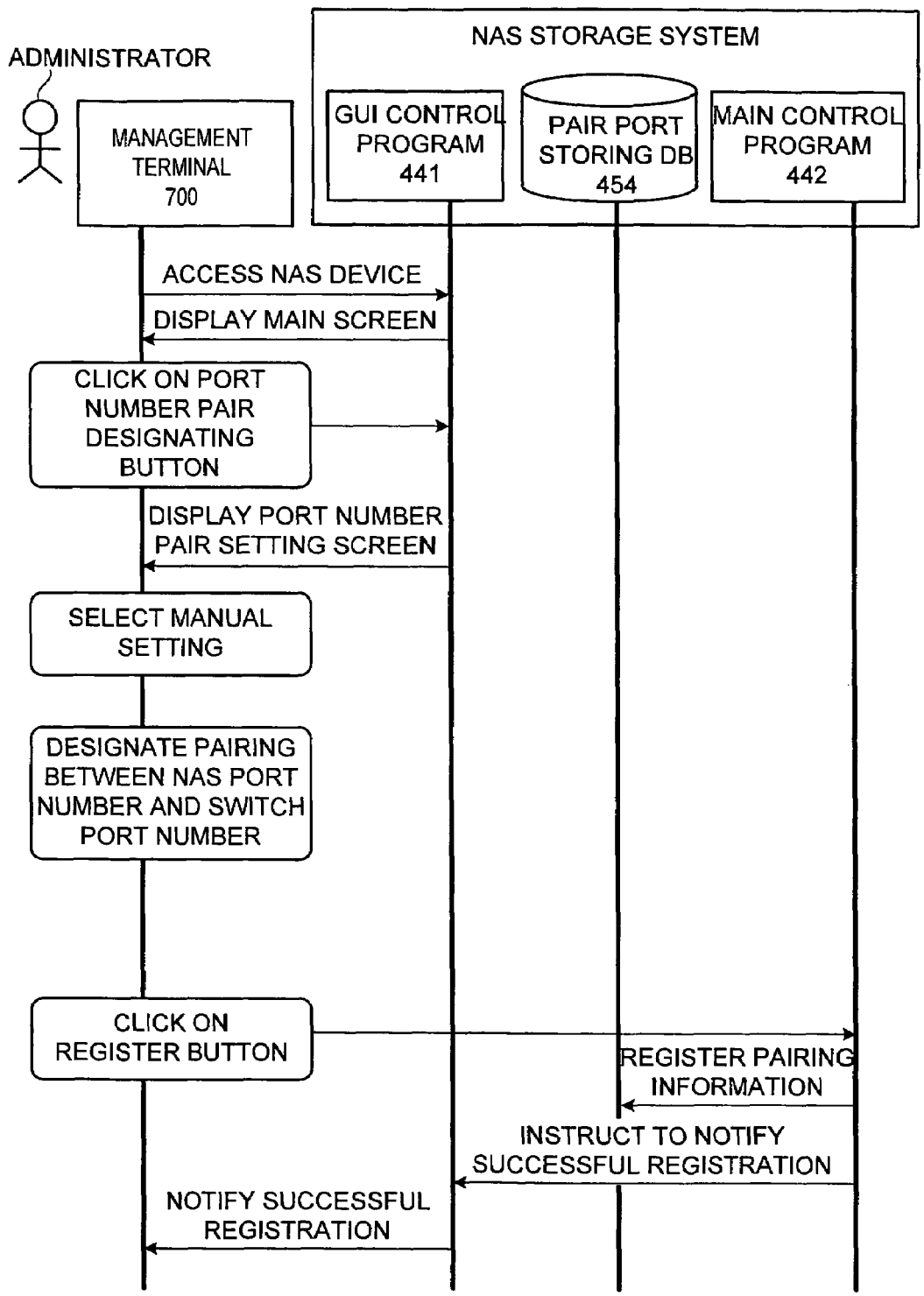
FIG. 17 is a sequence diagram for processing of setting a port number pair manually according to the first embodiment of this invention.

FIG. 17 is a sequence diagram for processing of setting a port number pair manually by an administrator.

An administrator manipulates the management terminal 700 to access the NAS storage system 400. The GUI control program 441 in the NAS storage system 400 accessed causes the display of the management terminal 700 to display the main screen (see FIG. 15) in response to the access.

Figure 18:
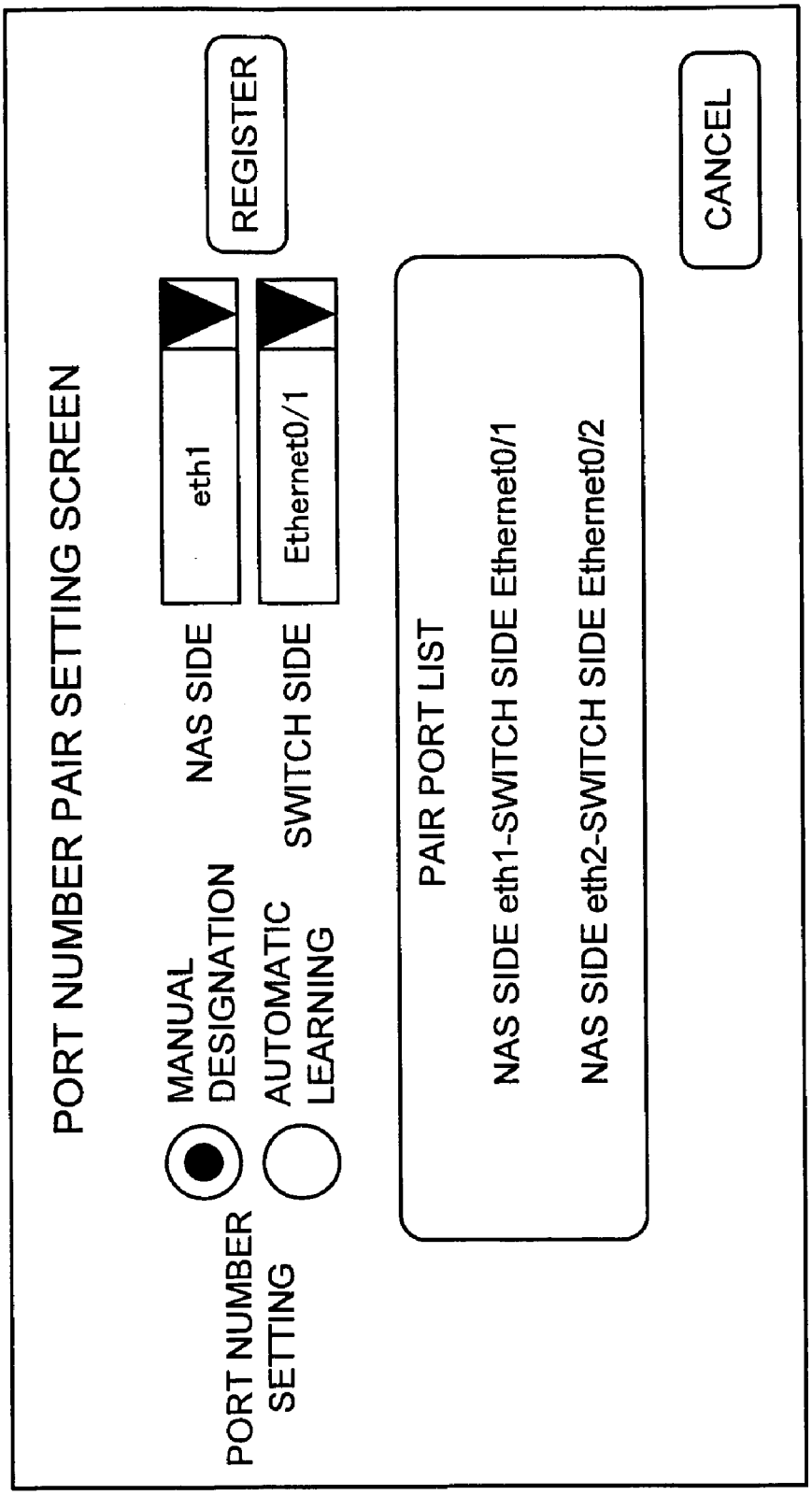
FIG. 18 is an explanatory diagram showing a port number pair setting screen according to the first embodiment of this invention.

The administrator clicks on a "port number pair setting" button on the main screen displayed on the management terminal. With the click of the "port number pair setting" button, the GUI control program 441 of the NAS storage system 400 causes the display to display a port number pair setting screen (see FIG. 18).

On the port number pair setting screen, the administrator first selects "manual designation". Then the administrator designates a port of the NAS storage system 400 along with a port of the switch 200 that is connected to the former port, and clicks on a "register" button.

Upon receiving the designated port number pair, the main control program 442 of the NAS storage system 400 registers this port number pair in the pair port storing DB 454. As the registration is completed, the main control program 442 instructs the GUI control program 441 to send a message "registration succeeded". Upon receiving the instruction, the GUI control program 441 notifies the management terminal 700 of success of registration.

With the above processing, manual registration of a port number pair according to an instruction from the administrator is completed.

Figure 19:
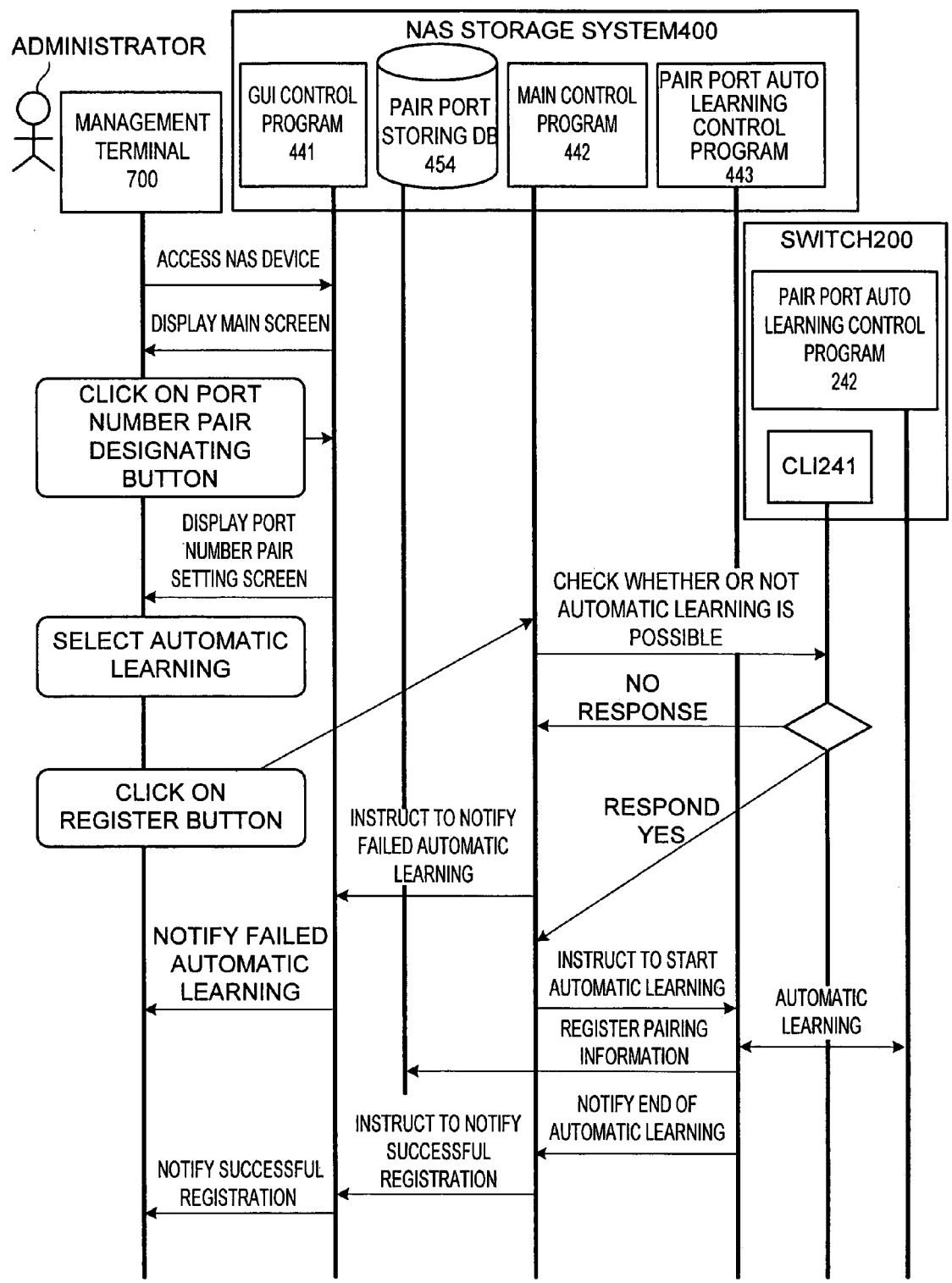
FIG. 19 is a sequence diagram for processing of setting a port number pair by auto learning according to the first embodiment of this invention.

FIG. 19 is a sequence diagram showing processing of setting a port number pair through auto learning.

An administrator manipulates the management terminal 700 to access the NAS storage system 400. The GUI control program 441 in the NAS storage system 400 accessed causes the display of the management terminal 700 to display the main screen (see FIG. 15) in response to the access.

The administrator clicks on the "port number pair setting" button on the main screen displayed on the management terminal. With the click of the "port number pair setting" button, the GUI control program 441 of the NAS storage system 400 causes the display to display the port number pair setting screen (see FIG. 18).

On the port number pair setting screen, the administrator selects "automatic setting" and clicks on the "register" button.

In response to the click of the "register" button, the NAS storage system 400 uses the main control program 442 to send, to its own switch 200 (the switch 200 that is connected to the NAS storage system 400), an inquiry message for checking whether auto learning is possible or not. The inquiry message is received by the CLI 241 of this switch 200. The CLI 241 sends in response a message "auto learning: YES" when this switch 200 supports auto learning. On the other hand, when this switch 200 does not support auto learning, the CLI 241 does not respond at all to the inquiry message sent from the main control program 442 of the NAS storage system 400. The main control program 442 knows failure of auto learning by, for example, passage of a given period of time without a response from the CLI 241, and instructs the GUI control program 441 to send a message "auto learning failed". Upon receiving the instruction, the GUI control program 441 notifies the management terminal 700 of failure of auto learning.

When the switch 200 sends a message "auto learning: YES" in response to the inquiry, the main control program 442 instructs the pair port auto learning control program 443 to start auto learning. Upon receiving the instruction, the pair port auto learning program 433 carries out auto learning of pair ports between the NAS storage system 400 and the switch 200. Auto learning means to obtain and specify setting information (a port number pair, for example) between devices. Port number pair information obtained as a result of the auto learning is registered in the pair port storing DB 454. As the auto learning is completed, the pair port auto learning control program 443 notifies the main control program 442 of the end of the auto learning. Upon receiving the notification, the main control program 442 instructs the GUI control program 441 to send a message "registration through auto learning succeeded". Upon receiving the instruction, the GUI control program 441 notifies the management terminal of success of registration.

The above processing completes registration of a port number pair through auto learning.

Figure 20:
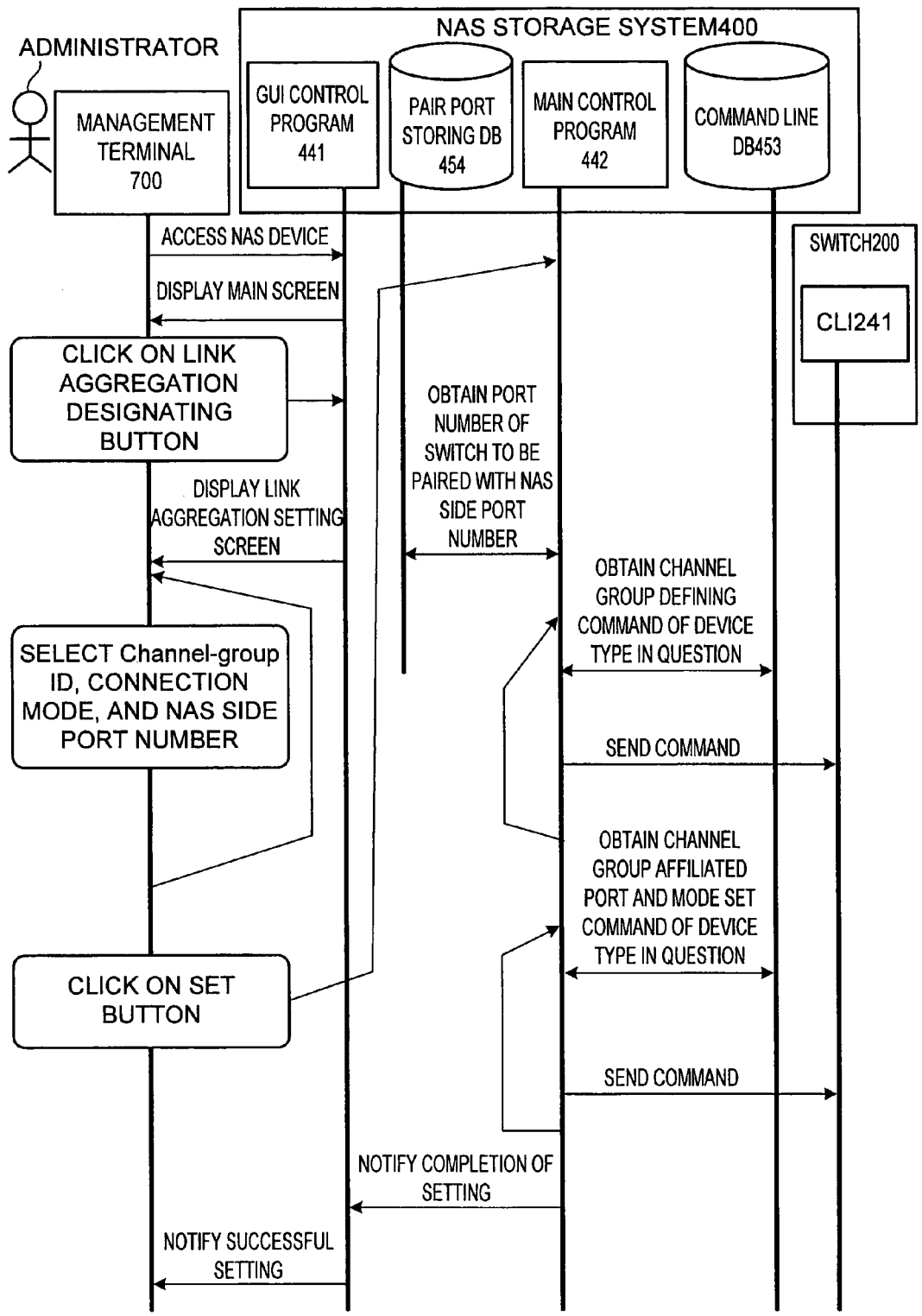
FIG. 20 is a sequence diagram of link aggregation setting processing according to the first embodiment of this invention.

FIG. 20 is a sequence diagram for processing of setting link aggregation.

An administrator manipulates the management terminal 700 to access the NAS storage system 400. The GUI control program 441 in the NAS storage system 400 accessed causes the display of the management terminal 700 to display the main screen (see FIG. 15) in response to the access.

Figure 21:
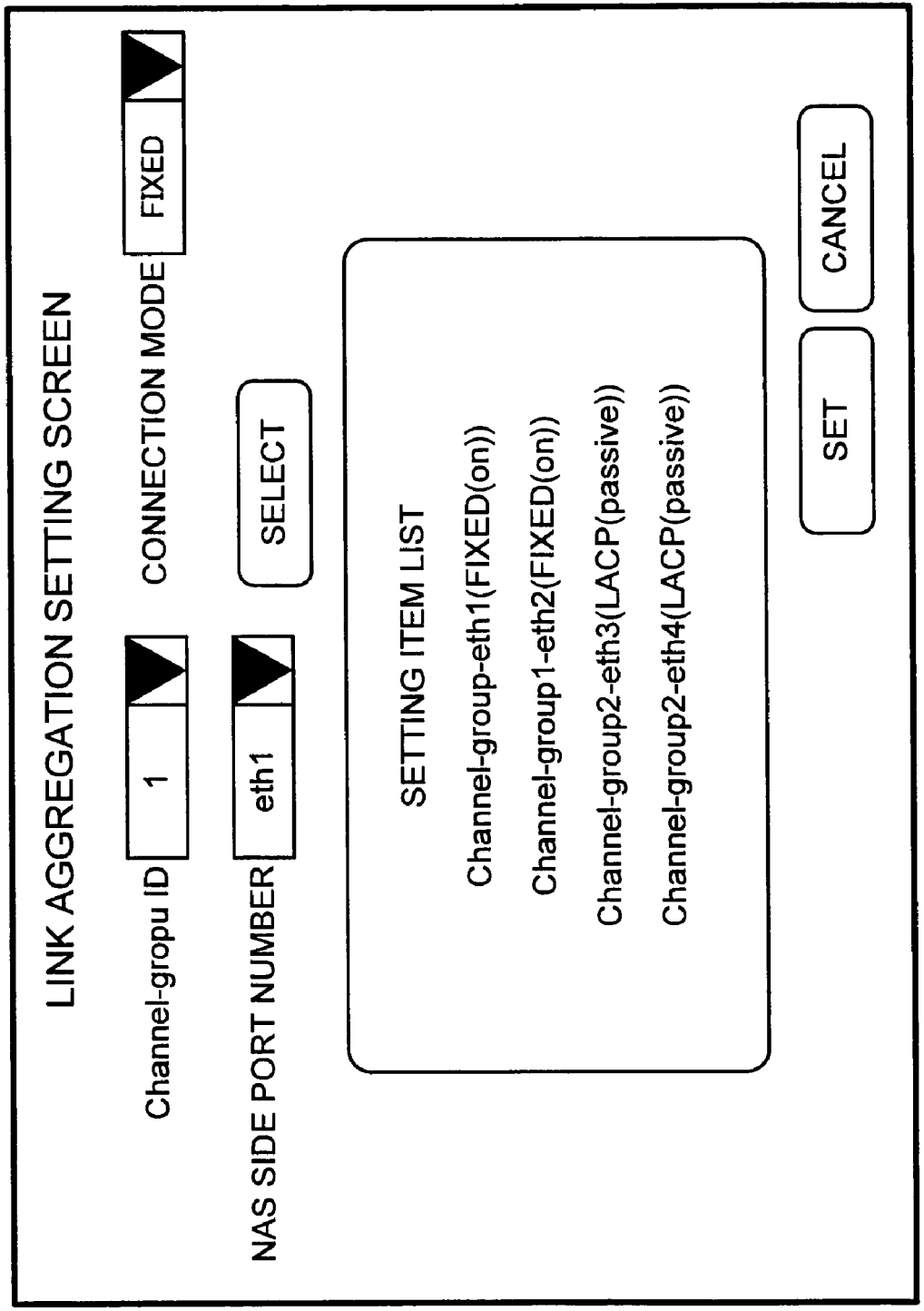
FIG. 21 is an explanatory diagram showing a link aggregation setting screen according to the first embodiment of this invention.

The administrator clicks on a "link aggregation setting" button on the main screen displayed on the management terminal. With the click of the "link aggregation setting" button, the GUI control program 441 of the NAS storage system 400 causes the display to display a link aggregation setting screen (see FIG. 21).

On the link aggregation setting screen, the administrator selects information necessary for link aggregation setting (a Channel-group ID, a connection mode, a NAS side port number), and clicks on a "set" button.

Upon receiving the information, the main control program 442 of the NAS storage system 400 first references the pair port storing DB 454 to obtain a port number of the switch 200 that is to be paired with the NAS side port number contained in the information.

The main control program 442 then obtains from the command line DB 453 a channel group defining command that corresponds to the device type of the switch 200 in question. The channel group defining command obtained is sent to the switch 200 based on the information set by the administrator, by using the command line from which it is obtained.

Next, the main control program 442 obtains from the command line DB 453 a channel group affiliated port and a mode setting command that correspond to the device type of the switch 200. The channel group affiliated port and mode setting command obtained are sent to the switch 200 based on the information set by the administrator, by using the command line from which they are obtained.

As the link aggregation setting is completed, the main control program 442 instructs the GUI control program 441 to send a message "setting through auto learning succeeded". Upon receiving the instruction, the GUI control program 441 notifies the management terminal of success of setting.

The above processing completes setting link aggregation according to an instruction from the administrator.

Figure 22:
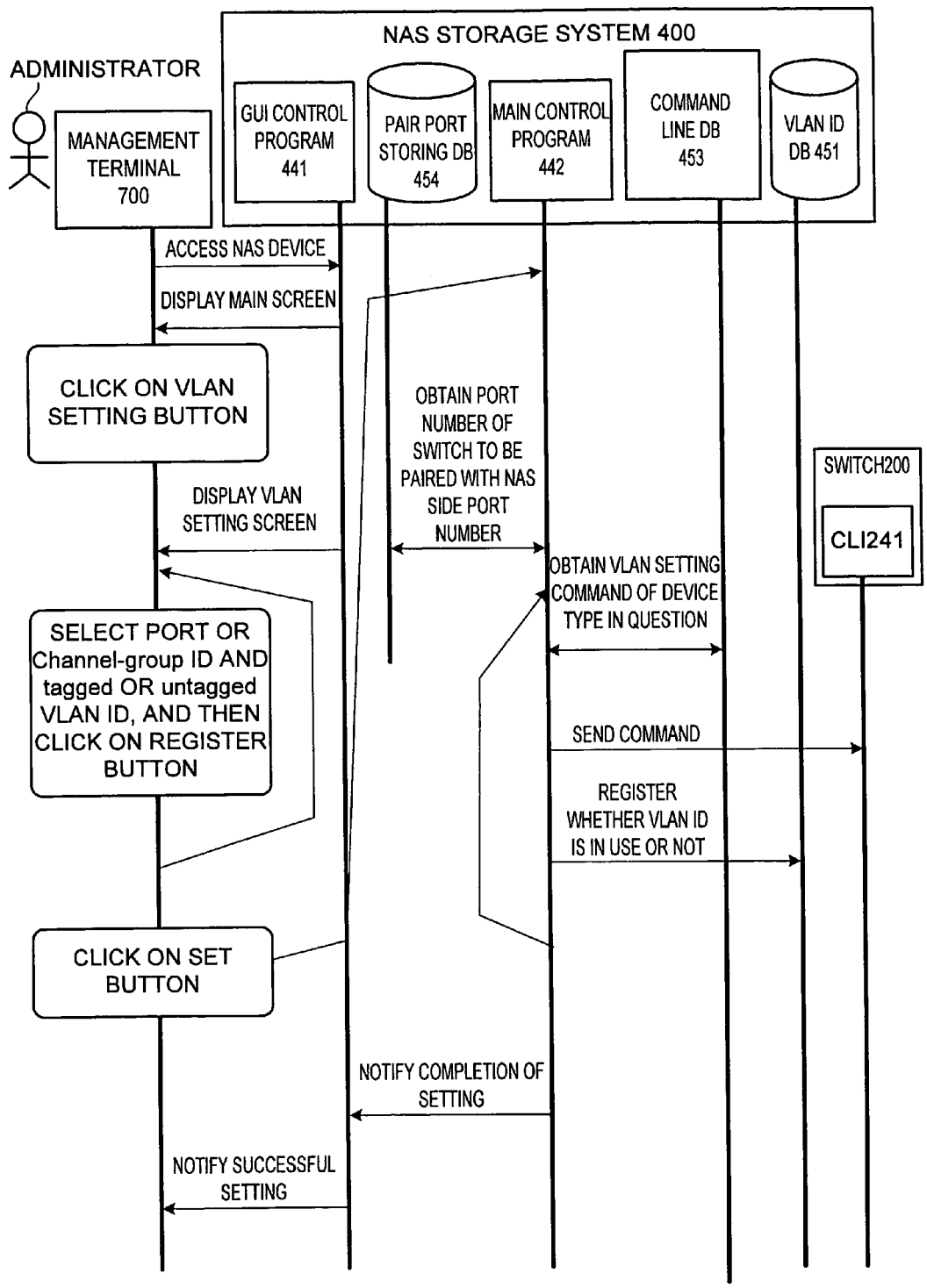
FIG. 22 is a sequence diagram of VLAN setting processing according to the first embodiment of this invention.

FIG. 22 is a sequence diagram showing processing of setting a VLAN.

An administrator manipulates the management terminal 700 to access the NAS storage system 400. The GUI control program 441 in the NAS storage system 400 accessed causes the display of the management terminal 700 to display the main screen (see FIG. 15) in response to the access.

Figure 23:
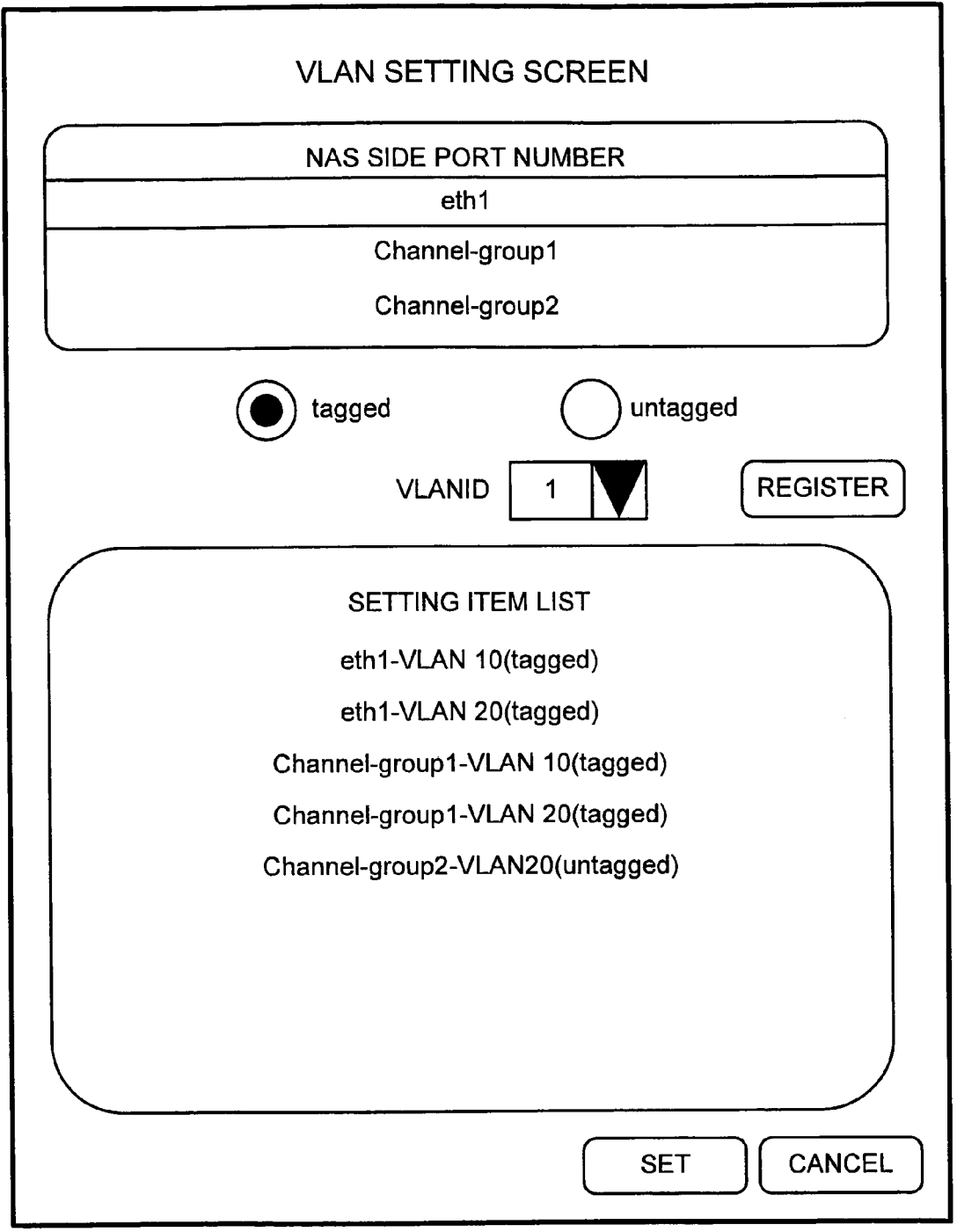
FIG. 23 is an explanatory diagram showing a VLAN setting screen according to the first embodiment of this invention.

The administrator clicks on a "VLAN setting" button on the main screen displayed on the management terminal. With the click of the "VLAN setting" button, the GUI control program 441 of the NAS storage system 400 causes the display to display a VLAN setting screen (see FIG. 23).

On the VLAN setting screen, the administrator selects a NAS port number (or Channel-group ID), chooses between tagged and untagged, selects a VLAN-ID, and clicks on a "register" button. These items are selected for other VLANs, if necessary, and the "register" button is clicked. The registered VLANs are displayed in a setting item list. When every VLAN is registered, the administrator clicks on a "set" button.

Upon receiving the information, the main control program 442 of the NAS storage system 400 first references the pair port storing DB 454 to obtain a port number of the switch 200 that is to be paired with the NAS side port number contained in the information. The main control program 442 then obtains from the command line DB 453 a VLAN setting command that corresponds to the device type of the switch 200. The VLAN setting command obtained is sent to the switch 200 based on the information set by the administrator, by using the command line from which it is obtained. At this point, whether the set VLAN-ID is in use or not is registered in the VLAN-ID DB 451.

As the VLAN setting is completed, the main control program 442 instructs the GUI control program 441 to send a message "VLAN setting succeeded". Upon receiving the instruction, the GUI control program 441 notifies the management terminal 700 of success of setting.

Through the above processing, a tagged or untagged VLAN is set to a port or group.

In the first embodiment described above, authentication can be tested for other nodes on the network, such as the switch 200 and the file servers 300, by a simple manipulation once an administrator sets authentication information for other nodes from the management terminal 700 through the NAS storage system 400. This configuration enables the NAS storage system 400 to manage in a centralized manner setting and modification of the configuration of other nodes on the network than the NAS storage system 400, thereby facilitating network system management.

A second embodiment of this invention will be described below.

A network system according to the second embodiment is structured such that the method of managing other nodes than a NAS storage system 400 on the network system which has been described in the first embodiment is used to obtain setting information of file servers 300 on the network system and relocate data of the file servers 300 to virtual file servers set up in the NAS storage system 400. In the second embodiment, configurations identical to those in the first embodiment are denoted by the same symbols and descriptions thereof will be omitted.

Figure 24:
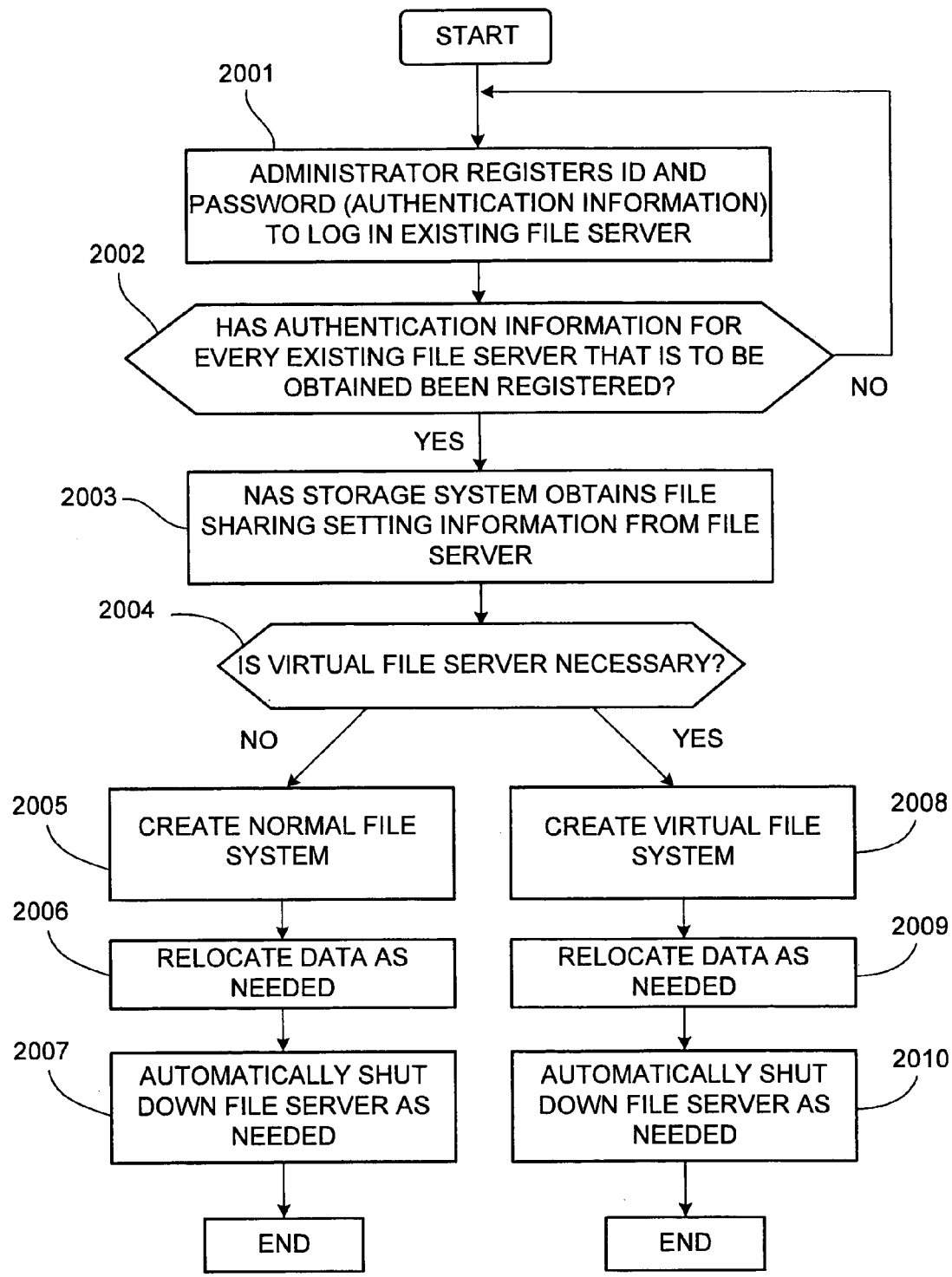
FIG. 24 is a flow chart for processing of obtaining setting information of existing file servers 300 and setting a virtual file server according to a second embodiment of this invention.

FIG. 24 is a flow chart showing processing of obtaining setting information of the existing file servers 300 and setting virtual file servers in the second embodiment.

First, an administrator accesses the NAS storage system 400 from the management terminal 700. The administrator then inputs authentication information for the file servers 300 through the GUI control program 441 of the NAS storage system 400 accessed, thereby registering the authentication information for the file servers 300 (processing 2001). As has been described in detail with reference to FIG. 14, once authentication information is registered in the NAS storage system 400 through this processing by the administrator, a device can be tested for authentication by merely specifying its device/OS name. When there is more than one file server from which setting information is to be obtained, the processing 2001 is repeated (processing 2002).

The NAS storage system 400 then obtains file share configuration from a target file server (existing file server) from which setting is to be obtained (processing 2003). The processing 2003 will be discussed later with reference to FIG. 25.

After the file share configuration is obtained, the administrator judges whether or not to create a virtual file server in the NAS storage system 400 (processing 2004). When a virtual file server is not to be set up, a normal file system is created in the NAS storage system 400 (processing 2005), data is relocated from the target file server which is one of the existing file servers 300 to the file system (processing 2006), and the file server in question is shut down (processing 2007). Details of the processing 2005 through 2007 will be described later with reference to FIG. 27.

When it is judged that a virtual file server is necessary, a virtual file system is created in the NAS storage system 400 (processing 2008), data is relocated from that target file server which is one of the existing file servers 300 to the virtual file system as needed (processing 2009), and the file server in question is shut down (processing 2010).

Details of the processing 2008 through 2010 will be described later with reference to FIG. 29.

Figure 25:
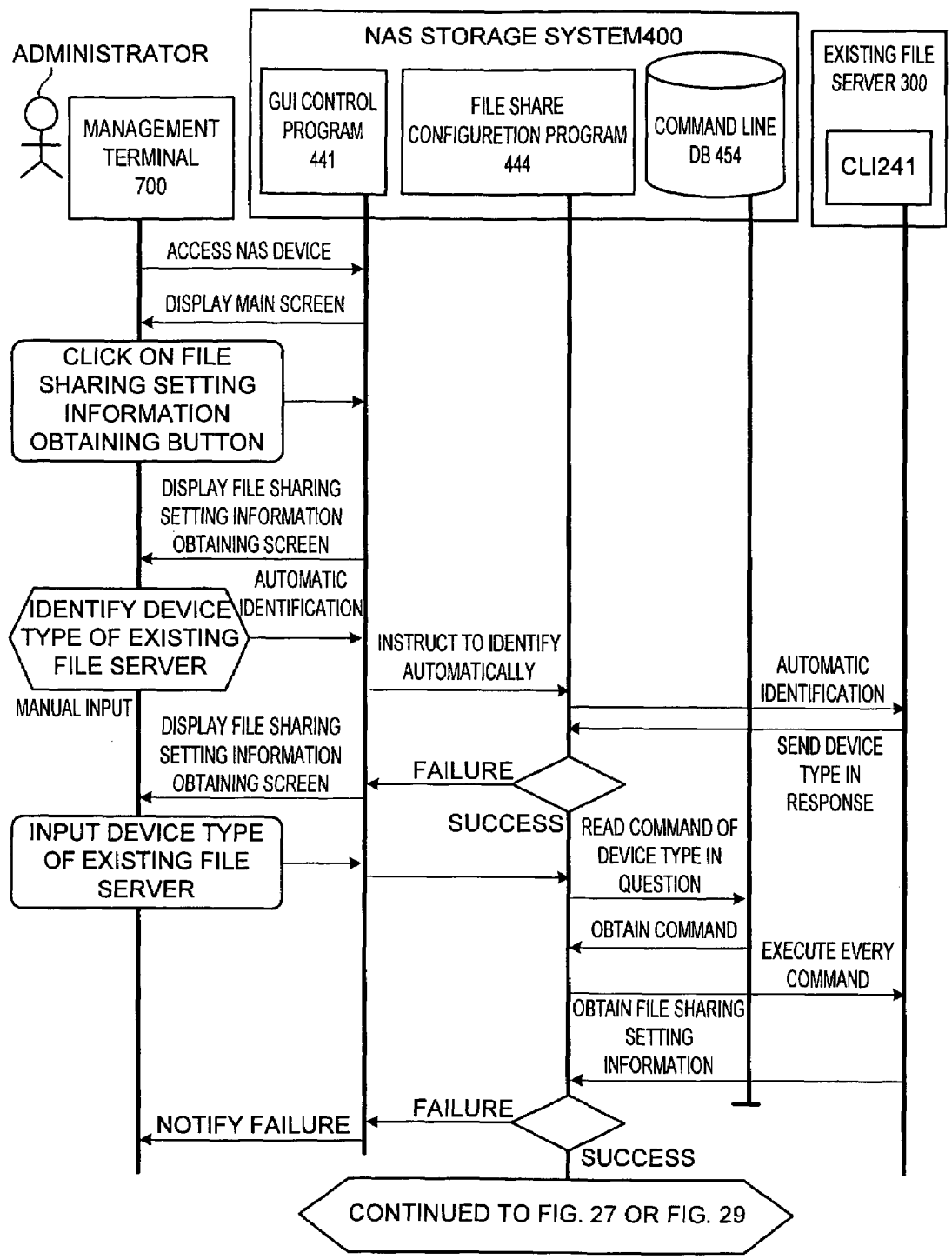
FIG. 25 is a sequence diagram for processing of obtaining file share configuration according to the second embodiment of this invention.

FIG. 25 is a sequence diagram showing processing of obtaining file share configuration from an existing file server.

An administrator manipulates the management terminal 700 to access the NAS storage system 400. The GUI control program 441 in the NAS storage system 400 accessed causes the display of the management terminal 700 to display the main screen (see FIG. 15) in response to the access.

Figure 26:
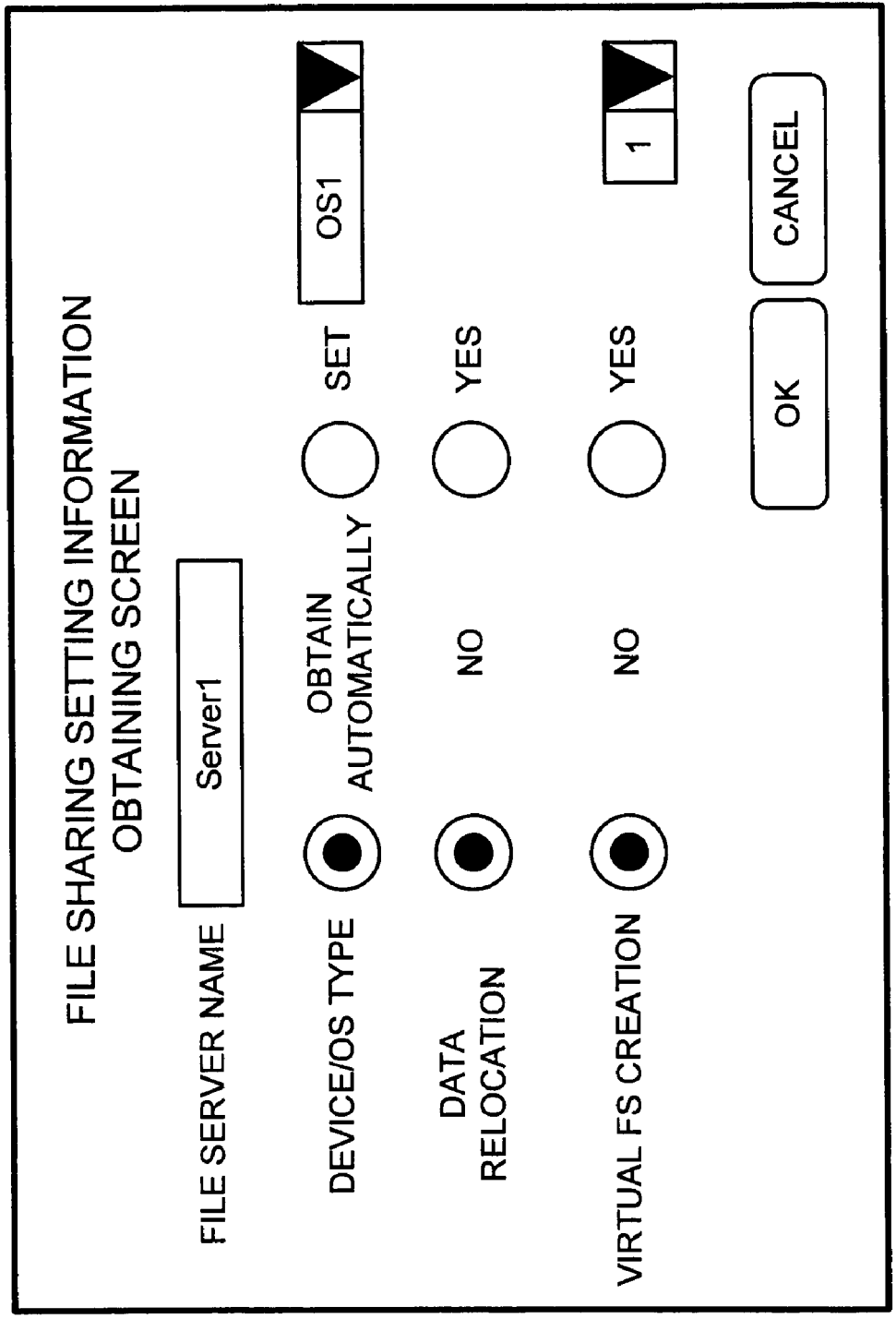
FIG. 26 is an explanatory diagram showing a file share configuration obtaining screen according to the second embodiment of this invention.

The administrator clicks on an "obtain file share configuration" button on the main screen displayed on the management terminal. With the click of the "obtain file share configuration" button, the GUI control program 441 of the NAS storage system 400 causes the display to display a file share configuration obtaining screen (see FIG. 26).

The administrator first chooses between automatic identification and manual identification of the device type of the existing file server. When automatic device type identification is chosen, the administrator checks an "obtain automatically" box on the file share configuration obtaining screen. When manual device type identification is chosen, the administrator checks a radio button "set" on the screen, inputs the device name of the target existing file server, specifies its OS, and clicks on an "OK" button.

In the case where data is to be relocated from the existing file server, a radio button "relocate data: yes" is checked on the screen. In the case where a virtual file server is to be created, a radio button "virtual file server creation: yes" is checked on the screen and, if necessary, a VLAN-ID is specified.

When the radio button "obtain automatically" is checked to identify the device type of the existing file server, the GUI control program 441 instructs a file share configuration program 444 to identify automatically. Upon receiving the instruction, the file share configuration program 444 inquires this existing file server about device type information automatic identification.

In response to the inquiry, a CLI 341 of the file server in question which is one of the existing file servers 300 sends device type information to the file share configuration program 444.

Upon receiving the information, the file share configuration program 444 judges whether automatic identification has succeeded or not. When device information is not received from the CLI 341 at all or the information received is incorrect, the file share configuration program 444 judges that automatic identification has failed and instructs the GUI control program 441 to send a message "failure".

The GUI control program 441 causes the management terminal 700 to display the file share configuration obtaining screen and sends to the administrator a message to the effect that automatic identification has failed. When notified of the failure, the administrator selects the device name manually.

When automatic identification has succeeded, the file share configuration program 444 uses the received device type information to obtain from a command line DB 453 a command that applies to the device type in question (a file share configuration obtaining command). The command obtained is executed to obtain file share configuration from the existing file server.

If at this point file share configuration cannot be obtained properly, the GUI control program 411 is instructed to notify failure in obtaining file share configuration. The GUI control program 441 sends to the administrator a message to the effect that the program 444 has failed to obtain file share configuration.

In the case where file share configuration is obtained successfully, the file share configuration program 444 judges whether to create a virtual file server or not. When a virtual file server is not to be created (when a normal file system is to be created instead), the procedure advances to processing of FIG. 27. When a virtual file server is to be created, the procedure advances to processing of FIG. 29.

Figure 27:
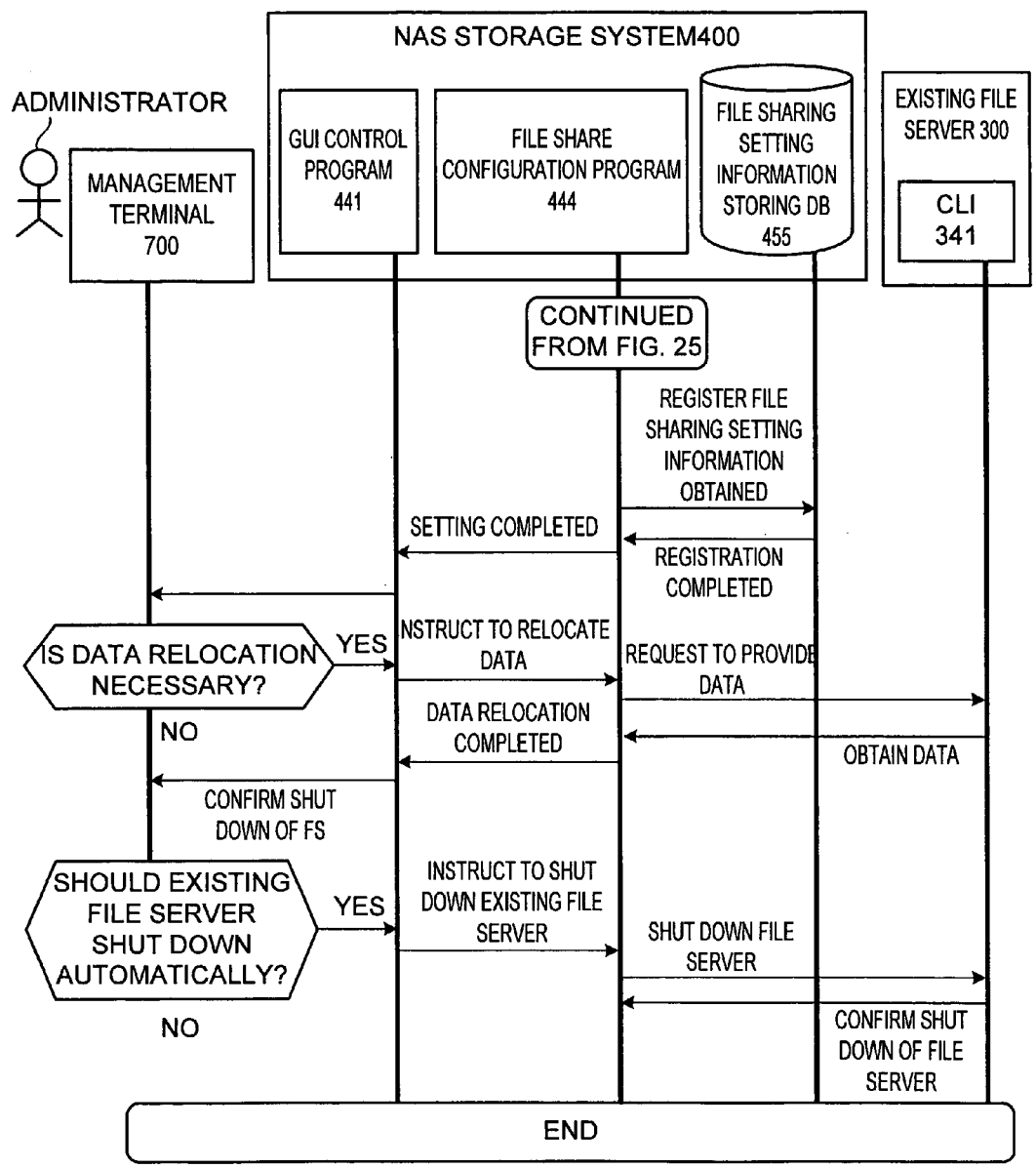
FIG. 27 is a sequence diagram for processing of creating a normal file system according to the second embodiment of this invention.

FIG. 27 is a sequence diagram for processing of creating a normal file system in the NAS storage system 400.

First, the file share configuration program 444 registers the file share configuration obtained from the file server in question which is one of the existing file servers 300 in a file share configuration storing DB 455.

When informed of completion of the registration from the file share configuration storing DB 455, the file share configuration program 444 instructs the GUI control program 441 to notify completion of setting file share configuration. Upon receiving the instruction, the GUI control program 441 notifies the management terminal 700 of completion of setting.

The administrator next judges whether or not data is to be relocated. As described with reference to FIG. 25, since whether data should be relocated or not has been designated on the file share configuration obtaining screen, the processing branches from here on according to the designation.

When data is to be relocated, the GUI control program 441 instructs the file share configuration program 444 to relocate data. Upon receiving the instruction, the file share configuration program 444 requests the target file server which is one of the existing file servers 300 to provide data. The file share configuration program 444 making this data obtainment request, obtains from the command line DB 453 a command line that corresponds to a request of obtaining data of the target file server which is one of the existing file servers 300, and sends the obtained command line to the target file server.

The target file server which is one of the existing file servers 300 having received the file obtainment request sends file data it holds to the NAS storage system 400.

With the data obtained, the file share configuration program 444 instructs the GUI control program 441 to notify completion of data relocation. Upon receiving the instruction, the GUI control program 441 notifies the management terminal 700 of completion of data relocation, and has the management terminal 700 display a file server shut down confirmation screen (see FIG. 28) to check whether the file server in question which is one of the existing file servers 300 is to be shut down or not.

On the file server shut down confirmation screen, the administrator clicks on a "YES" button when the file server in question which is one of the existing file servers 300 is to be shut down and a "NO" button when the server is not to be shut down. With the click of the "NO" button, the processing is ended.

When the "YES" button is clicked, in other words, when the file server in question which is one of the existing file servers 300 is to be shut down, the GUI control program 441 instructs the file share configuration program 444 to shut down the existing file server.

Upon receiving the instruction, the file share configuration program 444 requests the file server in question which is one of the existing file servers 300 to shut down. The file share configuration program 444 making this file server shut down request obtains from the command line DB 453 a command line that corresponds to a request to shut down the file server in question which is one of the existing file servers 300, and sends the obtained command line to the target file server.

The target file server which is one of the existing file servers 300 having received the file server shut down request shuts down.

When it is confirmed that the file server in question which is one of the existing file servers 300 is shut down, the file share configuration program 444 terminates the processing.

Figure 29:
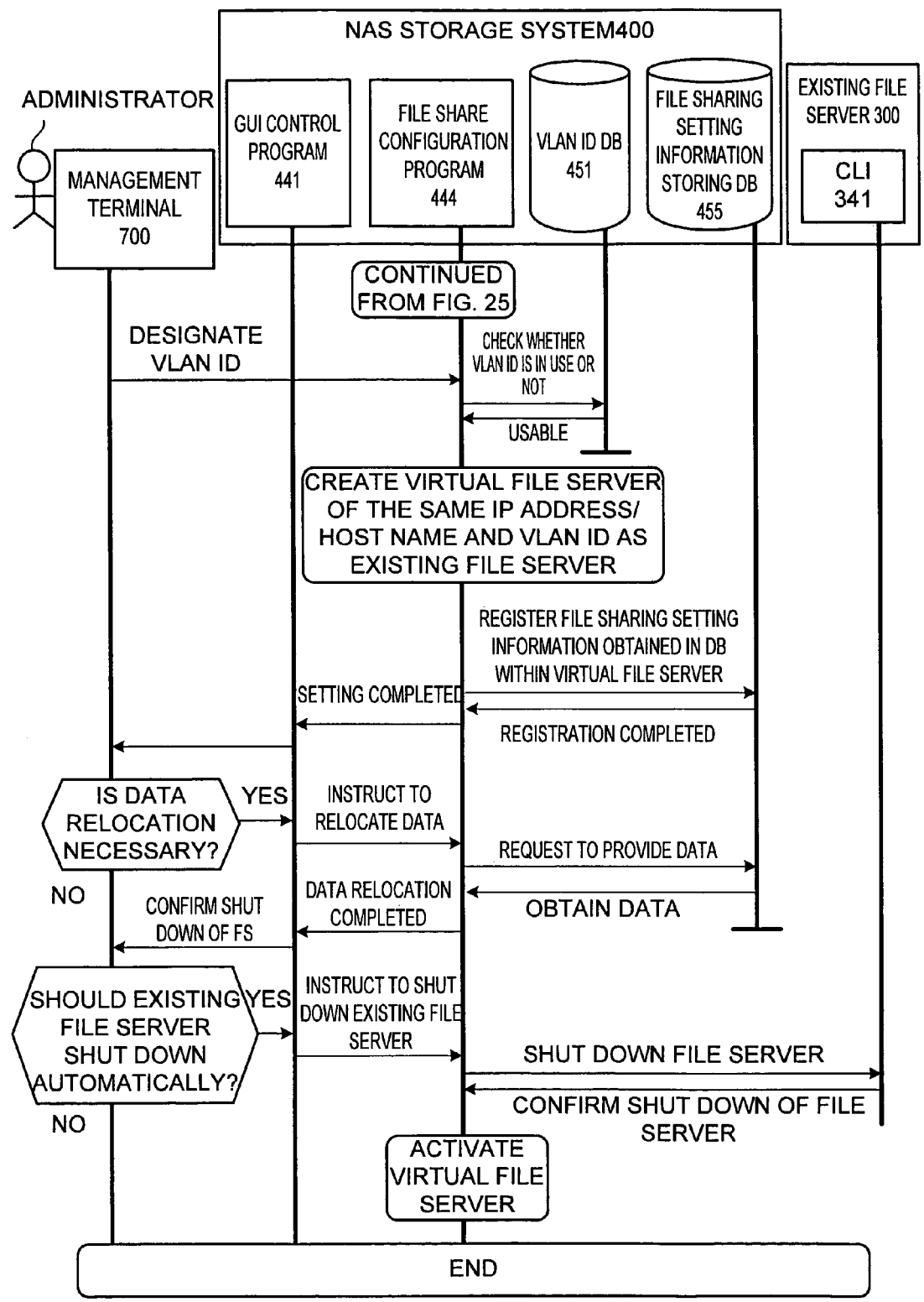
FIG. 29 is a sequence diagram for processing of creating a virtual file system according to the second embodiment of this invention.

FIG. 29 is a sequence diagram for processing of creating a virtual file system in the NAS storage system 400.

First, an administrator specifies a VLAN-ID. As described with reference to FIG. 25, since a VLAN-ID has been designated on the file share configuration obtaining screen, the same VLAN-ID is designated here.

With the VLAN-ID specified, the file share configuration program 444 references a VLAN-ID DB 451 to check whether the VLAN-ID specified is in use or not.

The file share configuration program 444 then creates virtual file servers (virtual file servers 460) which use the same IP address and host name as the existing file servers 300 and which use the specified VLAN-ID. File share configuration obtained from the existing file servers 300 is registered in file share configuration storing DBs 461 inside the created virtual file servers 460 and in a file share configuration storing DB 455.

When informed of completion of the registration from the file share configuration storing DB 455, the file share configuration program 444 instructs the GUI control program 411 to notify completion of setting file share configuration. Upon receiving the instruction, the GUI control program 441 notifies the management terminal 700 of completion of setting.

The administrator then judges whether data is to be relocated or not. As described with reference to FIG. 25, since whether data should be relocated or not has been designated on the file share configuration obtaining screen, the processing branches from here on according to the designation.

When data is to be relocated, the GUI control program 441 instructs the file share configuration program 444 to relocate data. Upon receiving the instruction, the file share configuration program 444 requests the file server in question which is one of the existing file servers 300 to provide data. The file share configuration program 444 making this data obtainment request obtains from the command line DB 453 a command line that corresponds to a request of obtaining data of the target file server which is one of the existing file servers 300, and sends the obtained command line to the target file server.

The target file server which is one of the existing file servers 300 having received the file obtainment request sends file data it holds to the NAS storage system 400. This file data is kept in a not-shown storage within the NAS storage system 400

With the data obtained, the file share configuration program 444 instructs the GUI control program 441 to notify completion of data relocation. Upon receiving the instruction, the GUI control program 441 notifies the management terminal 700 of completion of data relocation, and has the management terminal 700 display the file server shut down confirmation screen (see FIG. 28) to check whether the file server in question which is one of the existing file servers 300 is to be shut down or not.

On the file server shut down confirmation screen, the administrator clicks on the "YES" button when the file server in question which is one of the existing file servers 300 is to be shut down and the "NO" button when the server is not to be shut down. With the click of the "NO" button, the processing is ended.

When the "YES" button is clicked, in other words, when the file server in question which is one of the existing file servers 300 is to be shut down, the GUI control program 441 instructs the file share configuration program 444 to shut down the existing file server.

Upon receiving the instruction, the file share configuration program 444 requests the file server in question which is one of the existing file servers 300 to shut down. The file share configuration program 444 making this file server shut down request obtains from the command line DB 453 a command line that corresponds to a request to shut down the file server in question which is one of the existing file servers 300, and sends the obtained command line to the target file server.

The target file server which is one of the existing file servers 300 having received the file server shut down request shuts down.

When it is confirmed that the file server in question which is one of the existing file servers 300 is shut down, the file share configuration program 444 activates the virtual file servers 460 created, and terminates the processing. The existing file servers 300 are thus replaced by the virtual file servers 460.

In the second embodiment described above, as in the first embodiment, authentication can be tested for other nodes on the network, than the NAS storage system 400, such as the switch 200 and the file servers 300, by a simple manipulation once an administrator sets authentication information for the other nodes from the management terminal 700 through the NAS storage system 400. This configuration enables the NAS storage system 400 to manage in a centralized manner setting and modification of the configuration of other nodes on the network than the NAS storage system 400, thereby facilitating network system management. In particular, the second embodiment makes it possible to relocate data in the existing file servers 300 on the network to the NAS storage system 400 with ease.

While the present invention has been described in detail and pictorially in the accompanying drawings, the present invention is not limited to such detail but covers various obvious modifications and equivalent arrangements, which fall within the purview of the appended claims.

What is claimed is:

1. A storage system coupled to a network to provide a client with data, the network having a file server, an administrative terminal and a client coupled thereto, the storage system comprising:
   a control unit adapted to set other devices coupled to the network; and
   a setting command storing unit adapted to store a command for setting the other devices,
   wherein the control unit is adapted to:
   use the stored command to obtain information of the file server;
   create, based on the information obtained, a virtual file server to provide the client with a file;
   obtain a file held in the file server to store the obtained file;
   shut down the file server;
   activate the virtual file server; and
   provide, through the activated virtual file server, the client with the file stored.

2. The storage system according to claim 1, wherein the information obtained contains at least one selected from the group consisting of a host name of the file server, an IP address of the file server, a name of a shared directory, information about to where a file is disclosed, and a file sharing protocol.

3. The storage system according to claim 1, wherein the control unit is adapted to create, based on the information obtained, for each file server, a virtual file server that provides the client with a file held in the file server.

4. A storage system coupled to a network via a switch to provide a client with data, the network having a file server, an administrative terminal and a client coupled thereto, the storage system comprising:
   a control unit adapted to set the switch; and
   a setting command storing unit adapted to store a command for setting the switch,
   wherein the control unit is adapted to:
   use the stored command to obtain information of the file server and the switch;
   create, based on the information obtained, a virtual file server to provide the client with a file;
   set, based on the information obtained, the switch to provide the client with a file through the virtual server;
   obtain a file held in the file server to store the obtained file;
   shut down the file server;
   activate the virtual file server; and
   provide, through the activated virtual file server, the client with the file stored.

5. The storage system according to claim 4, comprising a pairing information storing unit that stores pairing between a port of the switch and a port of the storage system that is to be coupled to the port of the switch,
   wherein the control unit is adapted to:
   obtain information about the port of the switch from the pairing information storing unit; and
   use the stored command to set the switch through the port.

6. The storage system according to claim 5,
   wherein a management terminal is coupled to the network, wherein
   the management terminal designates pairing between a port of the switch and a port of the storage system that is to be coupled to the port of the switch, and
   the pairing information storing unit stores the pairing designated.

7. The storage system according to claim 5, wherein the pairing information storing unit obtains information about pairing between a port of the switch and a port of the storage system that is coupled to the port of the switch, and stores the obtained paring information.

8. The storage system according to claim 5,
   wherein setting of the switch is VLAN setting, and
   wherein the control unit is adapted to use the stored command to set the switch to VLAN setting.

9. The storage system according to claim 5,
   wherein setting of the switch is set for integrating at least two ports of the switch as one link, and
   wherein the control unit is adapted to use the stored command to set the switch to port integrating setting.

10. A storage system coupled to a network to provide a client with data via creation of a virtual file server, the network having a file server, an administrative terminal and a client coupled thereto, the storage system comprising:
    a control unit adapted to set configuration of other devices coupled to the network; and
    a setting command storing unit with pre-stored commands for setting configuration of the other devices,
    wherein the control unit is adapted to:
    use the pre-stored commands to obtain information of the file server;
    create, based on the information obtained, a virtual file server which is useable to provide the client with a file;
    obtain a file held in the file server;
    shut down the file server;
    activate the virtual file server, and store the file therein; and
    provide, through the activated virtual file server, the client with the file stored.

11. The storage system according to claim 10, wherein the information obtained contains at least one selected from the group consisting of a host name of the file server, an IP address of the file server, a name of a shared directory, information about to where a file is disclosed, and a file sharing protocol.

12. The storage system according to claim 10, wherein the control unit is adapted to create, based on the information obtained, for each file server, a virtual file server that provides the client with a file obtained from the file server.

13. A storage system coupled to a network via a switch to provide a client with data via creation of a virtual file server, the network having a file server, an administrative terminal and a client coupled thereto, the storage system comprising:
    a control unit adapted to set configuration of the switch; and
    a setting command storing unit with at least one pre-stored command for setting configuration of the switch,
    wherein the control unit is adapted to:
    use the at least one pre-stored command to obtain information of the file server and the switch;
    create, based on the information obtained, a virtual file server which is useable to provide the client with a file;
    set, based on the information obtained, the switch so that the switch is useable to provide the client with a file through the virtual server;

obtain a file held in the file server;

shut down the file server;

activate the virtual file server, and store the file therein; and provide, through the activated virtual file server, the client with the file stored.

14. The storage system according to claim 13, comprising a pairing information storing unit that stores pairing between a port of the switch and a port of the storage system that is to be coupled to the port of the switch, wherein the control unit is adapted to:

obtain information about the port of the switch from the pairing information storing unit; and use the at least one pre-stored command to set the switch through the port.

15. The storage system according to claim 14, wherein a management terminal is coupled to the network, wherein the management terminal is adapted to designate pairing between a port of the switch and a port of the storage system that is to be coupled to the port of the switch, and the pairing information storing unit stores the pairing designated.

16. The storage system according to claim 14, wherein the pairing information storing unit obtains information about pairing between a port of the switch and a port of the storage system that is coupled to the port of the switch, and stores the obtained paring information.

17. The storage system according to claim 14, wherein setting of the configuration of the switch is a VLAN configuration setting, and wherein the control unit is adapted to use the pre-stored command to set the switch to the VLAN configuration setting.

18. The storage system according to claim 14, wherein setting of the switch is a configuration setting for integrating at least two ports of the switch as one link, and wherein the control unit is adapted to use the pre-stored command to set the switch to the port integrating setting.

* * * * *